US007066482B2

(12) United States Patent
Ford

(10) Patent No.: US 7,066,482 B2
(45) Date of Patent: Jun. 27, 2006

(54) HANDLE ASSEMBLY FOR WHEEL CHAIR BRAKE MECHANISM

(75) Inventor: Jerry Ford, St. Charles, MN (US)

(73) Assignee: Jerry Ford Company LLC, St. Charles, MN (US)

( * ) Notice: Subject to any disclaimer, the term of this patent is extended or adjusted under 35 U.S.C. 154(b) by 0 days.

(21) Appl. No.: 11/119,448

(22) Filed: Apr. 29, 2005

(65) Prior Publication Data

US 2005/0248122 A1 Nov. 10, 2005

Related U.S. Application Data

(60) Provisional application No. 60/602,125, filed on Aug. 17, 2004, provisional application No. 60/567,907, filed on May 4, 2004.

(51) Int. Cl.
*B60T 1/04* (2006.01)

(52) U.S. Cl. .................................... 280/304.1; 188/2 F

(58) Field of Classification Search ............. 280/250.1, 280/204.1, 33.994, 304.1; 180/273; 188/2 F, 188/19, 31, 68

See application file for complete search history.

(56) References Cited

U.S. PATENT DOCUMENTS

| | | | |
|---|---|---|---|
| 4,320,818 | A | 3/1982 | Knoche |
| 4,623,043 | A | 11/1986 | Babilas |
| 5,036,959 | A | 8/1991 | Sarro |
| 5,203,433 | A | 4/1993 | Dugas |
| 5,451,193 | A | 9/1995 | Pickard |
| 5,667,236 | A | 9/1997 | Murphy |
| 5,799,756 | A | 9/1998 | Roberts et al. |
| 5,894,912 | A | 4/1999 | Dobben |
| D412,869 | S | 8/1999 | Bissell |
| 5,984,334 | A | 11/1999 | Dugas |
| 6,012,555 | A | 1/2000 | Duran et al. |
| 6,264,007 | B1 | 7/2001 | Norton et al. |
| 6,352,138 | B1 | 3/2002 | Duran et al. |
| 6,371,503 | B1 | 4/2002 | Ritchie et al. |
| 6,655,503 | B1 | 12/2003 | Moody |
| 6,688,437 | B1 | 2/2004 | Usherovich |
| 6,851,522 | B1 | 2/2005 | Wren |
| 2002/0145271 | A1 | 10/2002 | Sanchez |
| 2003/0098568 | A1 | 5/2003 | Keppler |
| 2003/0146056 | A1 | 8/2003 | Wren |
| 2003/0189310 | A1 | 10/2003 | Connors et al. |
| 2004/0051272 | A1 | 3/2004 | Wong |
| 2004/0080138 | A1 | 4/2004 | Kimura et al. |
| 2004/0104081 | A1 | 6/2004 | Peron et al. |

*Primary Examiner*—Anne Marie Beohler
(74) *Attorney, Agent, or Firm*—Patterson, Thuente, Skaar & Christensen, P.A.

(57) ABSTRACT

The brake handle assembly of the invention may be retrofittable to an existing foldable wheelchair. The brake handle assembly includes a coupling member provided to a foldable wheelchair frame near a handle grip. The brake release assembly further includes a hand release lever operably coupled to the coupling member and a wheel brake mechanism. The release lever may be configured to disengage the wheel brake mechanism from a wheel of the wheelchair when depressed by a user. The brake handle assembly may also further include a friction brake actuation mechanism and a brake lockout mechanism.

17 Claims, 25 Drawing Sheets

HANDLE ASSEMBLY FOR WHEEL CHAIR BRAKE MECHANISM

PRIORITY

This application claims the benefit of provisional patent application Ser. No. 60/602,125 filed on Aug. 17, 2004, and provisional patent application Ser. No. 60/567,907 filed on May 4, 2004, both of which are incorporated herein by reference in their entirety.

FIELD OF THE INVENTION

The invention generally relates to braking devices for wheelchairs. More particularly, the invention relates to a handle assembly operably coupled to an automatic brake mechanism for wheelchairs that allows an operator to selectively interact with the brake systems on the wheelchair.

BACKGROUND OF THE INVENTION

A conventional manual wheelchair is illustrated in FIGS. 1 and 2. Conventional manual wheelchairs 50 typically comprise a foldable frame 52, a seat 54 and a backrest 56, and a pair of manual brake mechanisms 58*a* and 58*b*. Two large drive wheels 60*a* and 60*b* are typically rotatably mounted to the foldable frame 52 to permit a user to operate and move the wheelchair. The manually operated hand brakes 58*a* and 58*b* are coupled to the wheelchair to engage and prevent rotational movement of the drive wheels. Conventional wheelchairs 50 also typically include leg rests 62 and armrests 64 for the comfort of the user.

The manual brake mechanisms 58*a* and 58*b* allow either a user or an attendant to lock the wheels of the wheelchair when exiting, for example, so that the chair does not move away when a patient attempts to enter or exit. Although the conventional manual brake mechanisms are sufficient for their intended purpose once engaged, the requirement that the user must remember to actuate the brakes leaves these devices susceptible to user error. For example, a conventional wheelchair will remain freely moveable if a user or attendant forgets to manually pivot the braking device and lock the wheels. The wheelchair may also remain freely moveable if a user or attendant does not fully apply the manual braking device to the wheels. As a result, a user attempting to stabilize themselves while entering or leaving the wheelchair, is at an increased risk of falling and injury due to the freely moveable wheelchair moving out from beneath them.

Attempts have been made to devise wheelchair-braking devices that automatically engage a wheel of a wheelchair when a user attempts to enter or leave the seat. For example, U.S. Pat. No. 5,894,912 to Dobben includes a sensing lever that senses when a user is entering or leaving the seat of a wheelchair. When the sensing lever senses a user exiting the seat it causes a braking lever to engage the wheels, thereby preventing free movement of the wheelchair. While the design of the wheelchair-braking device in Dobben fulfills its intended purpose, it has at least one significant shortcoming. In particular, the sensing lever, disposed beneath the seat, is continuously biased against a seated user. The continuously biased state of the sensing lever creates uncomfortable pressure points that are continuously felt by the seated user. These pressure points may additionally promote development of sores by the patient.

Another attempt at devising an automatic braking-device for a wheelchair is illustrated in U.S. Pat. No. 6,371,503 to Ritchie, et al. Ritchie discloses an L-shaped actuator that confronts a rear portion of the seat of a wheelchair. When a user sits in the wheelchair the seat engages the L-shaped actuator, which releases the braking-device. The actuator continues to press against the seated user until they exit the wheelchair. The automatic braking-device of Ritchie is susceptible to the same shortcomings as Dobben discussed above. In particular, the constant pressure by the actuator on the seated user creates a pressure point.

Other attempts to invent automatic braking-devices for wheelchairs have resulted in undesirably complicated braking assemblies. For example, U.S. Pat. No. 4,620,818 to Knoche, discloses a wheelchair having a sliding side frame that engages a pair of brake arms pivotally coupled to the wheelchair. The brake arms engage the wheels of the wheelchair as a user sits in the seat. Not only is the automatic braking assembly disclosed in Knoche overly-complicated, it also requires a user to modify the wheelchair's existing brake system. In particular, each of the brake arms includes a transverse portion that replaces the conventional manual wheelchair device. As a result, the modified wheelchair has only one braking device. Additionally, modifying the wheelchair in order to attach the transverse portion of the braking assembly may result in voiding the warranty of the wheelchair.

Still other attempts to resolve the problem associated with conventional wheelchair braking systems have resulted in modified wheelchair frames. For example, U.S. Pat. No. 5,984,334 to Dugas discloses a wheelchair with a moveable seat operationally coupled to a braking mechanism that locks one or more wheels when a user attempts to exit the seat. Another example of a modified device is U.S. Pat. No. 5,451,193 to Pickard. Pickard discloses a new wheelchair having four wheels of the same size. Additionally, the Pickard wheelchair is convertible to a walker. The custom nature of the Dugas and Pickard wheelchairs results in higher manufacturing costs, which are typically passed on to the consumer resulting in a more expensive wheelchair.

Another disadvantage with the previous attempts to provide automatic brake devices to a wheelchair is that the brake devices disable the manual wheelchair's ability to fold for storage or transport.

There remains a need in the wheelchair industry to provide an automatic braking mechanism that intervenes and prevents injuries caused by a freely movable wheelchair rolling out beneath a user as they attempt to enter or leave the seat portion, while addressing manufacturing, operability, cost and functional design issues.

SUMMARY OF THE INVENTION

The present invention, through various embodiments, provides a handle mechanism for a user to interact with an automatic wheelchair brake device that addresses the deficiencies of the prior art attempts to provide handle actuators for wheelchairs with automatically applying brakes. In particular embodiments as will be described herein, the handle mechanisms allow a user to selectively release the otherwise engaged brakes due to the use of automatically applied wheelchair brakes. The handle mechanism is functional even when the wheelchair is folded and foldability is not impaired when the one or more handle mechanisms are provide to the foldable wheelchair. The handle device is generally easily retrofittable to an existing wheelchair frame and is locatable convenient to the user. A user may be assisted by gravity to push downward to disengage the automatic brake mechanism. A lockout device may also be used to lock the brakes in a disengaged position and the lockout device may be configured to reset by the operation of gravity when the handles are pushed momentarily or a patient sits in the wheelchair. The handle mechanism may also be configured to be used with friction brakes that allow a user to selectively slow a wheelchair when encountering runaway potential circumstances such as downward sloping paths. The handle mechanism of the present invention may also be manufactured for a minimum of cost compared to automatic brake designs in the prior art.

The brake handle assembly of one embodiment of the invention may be retrofittable to an existing foldable wheelchair. The brake handle assembly includes a coupling member provided to a foldable wheelchair frame near a handle grip. The brake release assembly further includes a hand release lever operably coupled to the coupling member and a wheel brake mechanism. The release lever may be configured to disengage the wheel brake mechanism from a wheel of the wheelchair when depressed by a user.

The brake handle assembly of another embodiment of the invention may further include a friction brake actuation mechanism. The brake handle assembly of another embodiment of the invention may also include a brake lockout mechanism.

Another embodiment of the invention includes a method of transporting a folded wheelchair that has brakes that automatically apply when the wheelchair is unoccupied. The method includes pushing downwards on a handle release lever to cause an automatic wheel brake mechanism to disengage a wheel of the wheelchair, thereby allowing the wheel to rotate freely.

Another embodiment of the invention includes brake release assembly retrofittable to an existing foldable wheelchair. The handle brake mechanism includes a first coupling member disposed on a foldable wheelchair frame proximate a first handle thereof and a second coupling member disposed proximate a second handle of the foldable wheelchair frame. The first hand release lever may be operably coupled to the first coupling member and a first wheel brake mechanism. The first release lever may be configured to disengage the first wheel brake mechanism from a first wheel of the wheelchair when depressed by a user. The handle brake mechanism further includes a second hand release lever operably coupled to the second coupling member and a second wheel brake mechanism. The second release lever may be configured to disengage the second wheel brake mechanism from a second wheel of the wheelchair when depressed by a user. The first wheel brake mechanism and the second wheel brake mechanism may each be configured to operate independently so as to facilitate unimpeded folding of the wheelchair.

The above summary of the present invention is not intended to describe each illustrated embodiment or every implementation of the present invention. The following figures and detailed description more particularly exemplify the embodiments of the present invention.

BRIEF DESCRIPTION OF THE DRAWINGS

The invention may be more completely understood in consideration of the following detailed description of various embodiments of the invention in connection with accompanying figures, in which.

Figure 1:
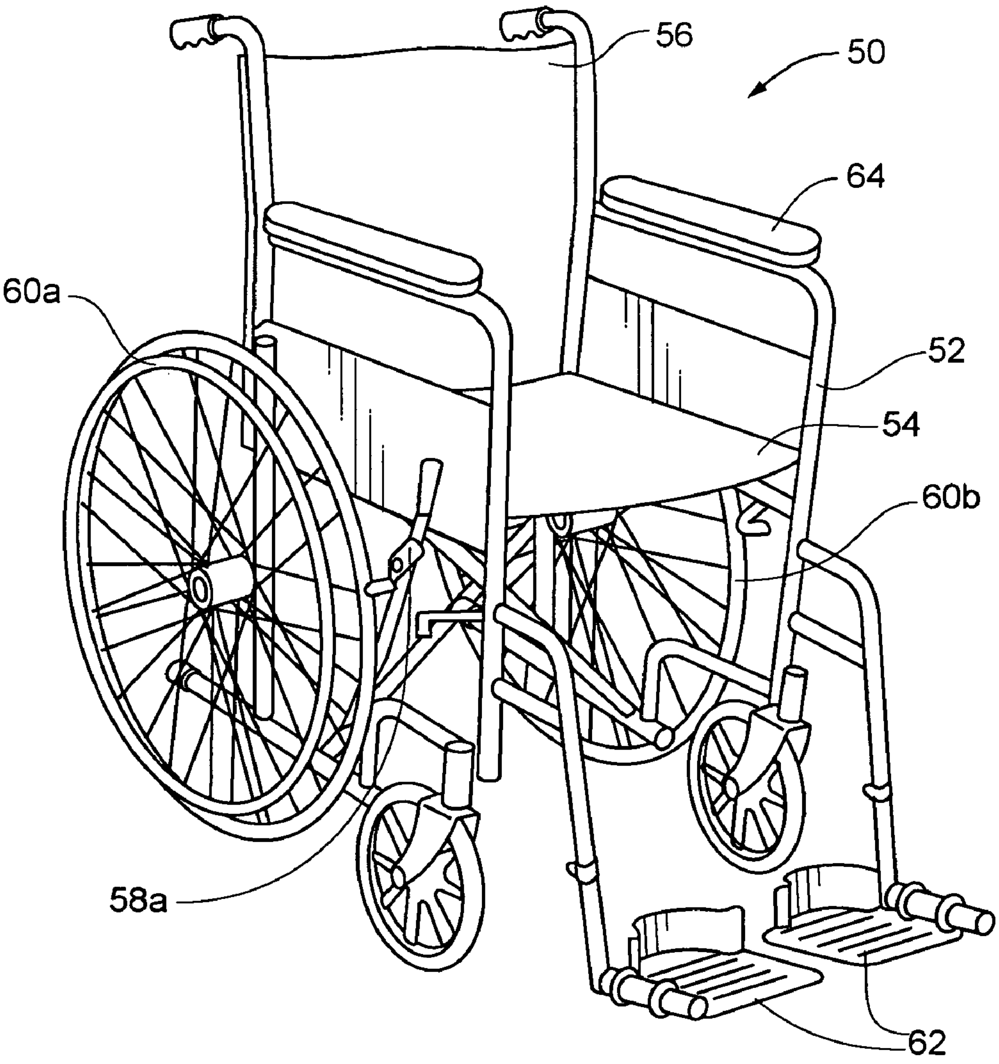
Fig. 1 Prior Art
FIG. 1 is a perspective view of a conventional manual wheelchair with manually operated brake mechanism.
Figure 2:
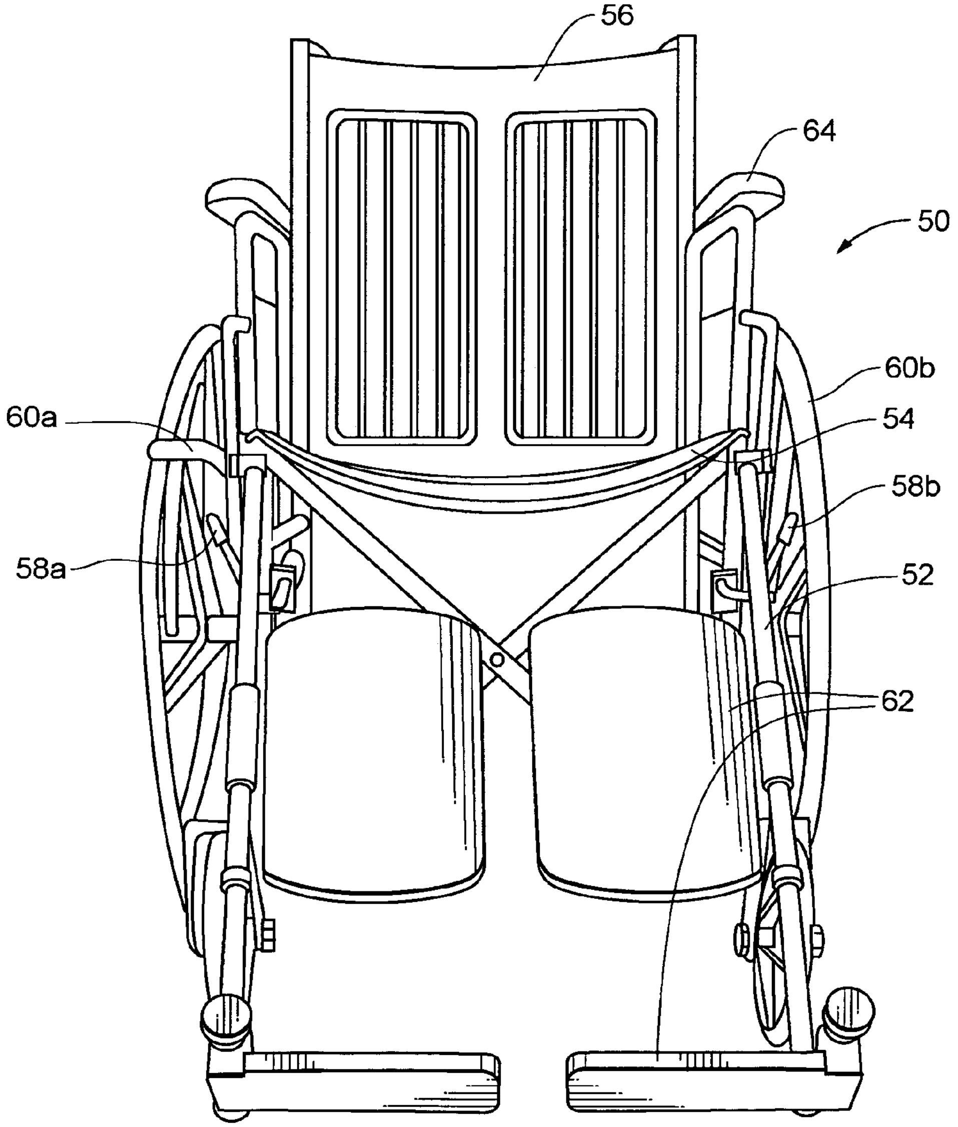
Fig. 2 Prior Art
FIG. 2 is a front view of a conventional manual wheelchair with manually operated brake mechanism.

While the present invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF PREFERRED EMBODIMENTS

FIGS. 3–18 collectively illustrate a wheelchair with a weight-actuated brake mechanism, indicated by numeral 100, to control the free movement of the wheelchair. Referring generally to FIGS. 3–5C, and particularly to FIGS. 3 and 4, typically two wheelchair brake mechanisms 100*a* (in an exploded view) and 100*b* are attached to a wheelchair 102. Each wheelchair brake mechanism 100*a* and 100*b* controls the rotational movement of each of drive wheels 110*a* and 110*b* respectively. The following description of the wheelchair brake mechanisms 100*a* and 100*b* will be discussed singularly, but it should be noted that it applies equally to both mechanisms 100*a* and 100*b*.

The wheelchair brake mechanism 100*a* includes at least one support structure 200 comprising an elongate bar that is pivotally coupled to a portion of the foldable frame 108. Although an elongate bar is shown and discussed as one of the example embodiments, it should also be noted that the support structure 200 may also comprise a rod or other similar component. The support structure 200 is preferably disposed generally between a respective drive wheel 110*a*, 110*b* and the foldable frame 108. At least a portion of the support structure 200 is disposed generally proximate the drive wheel 110*a*, such that it may engage the drive wheel 110*a* and prevent rotational movement thereof as a user enters or leaves the seat 104.

Figure 3:
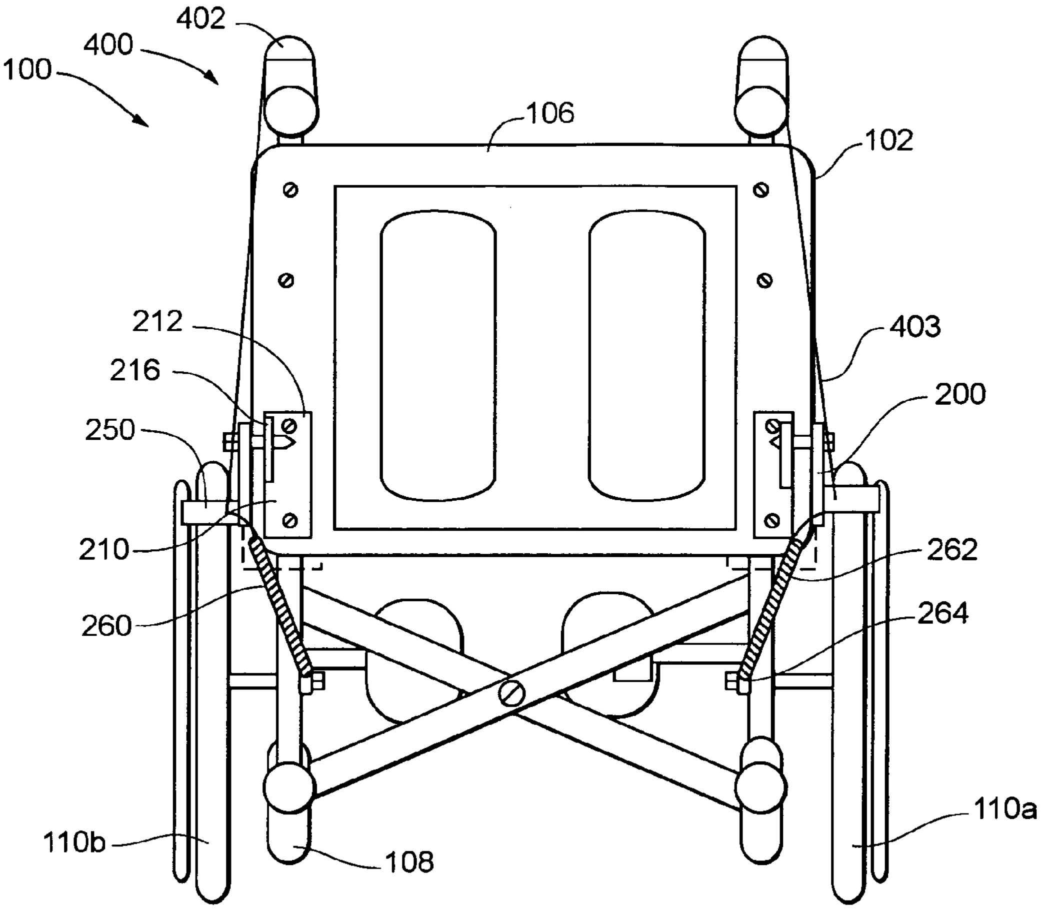
FIG. 3 is a rear view of a wheelchair brake mechanism according to an example embodiment of the present invention
Figure 4:
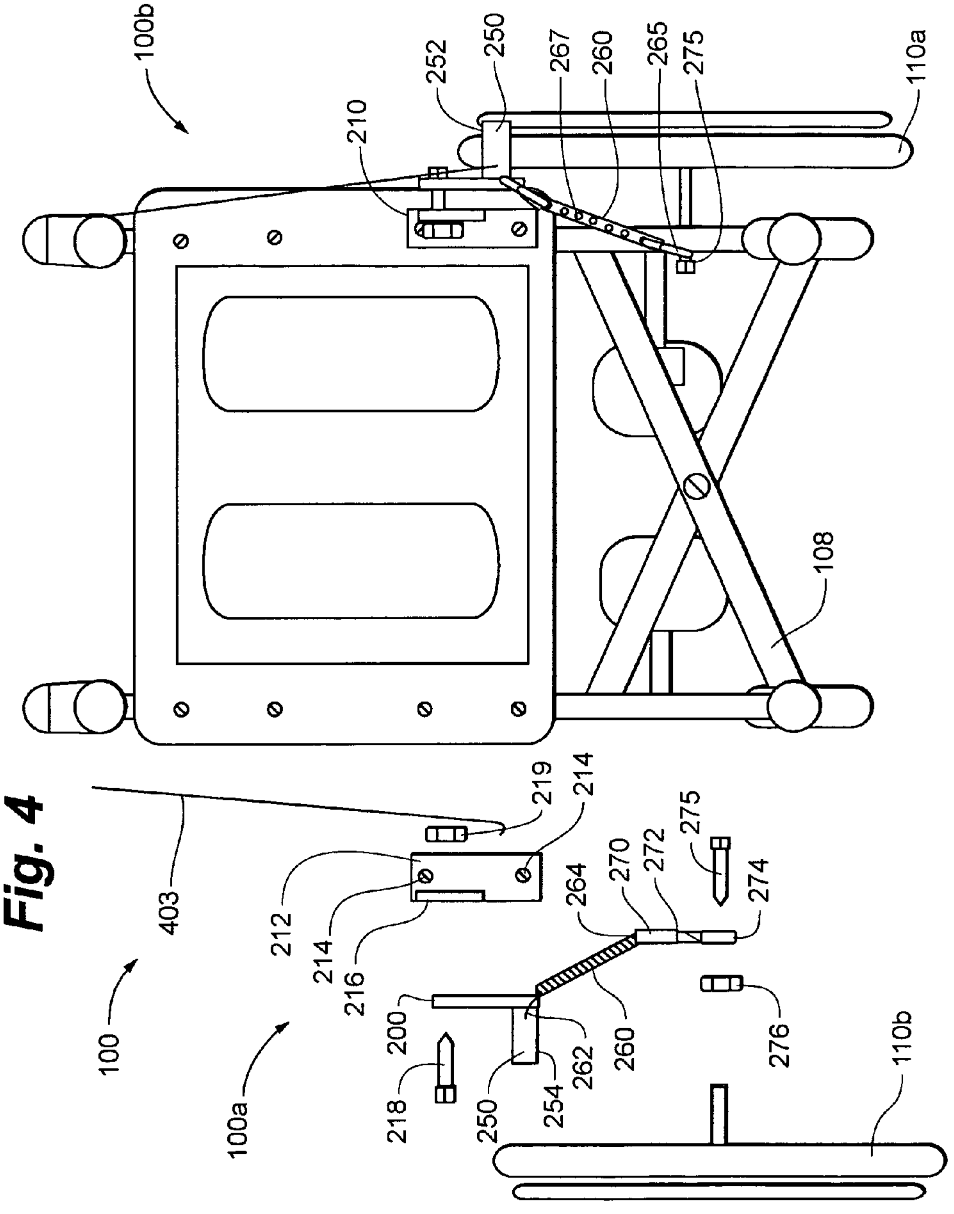
FIG. 4 is a partial exploded rear view of a wheelchair brake mechanism according to an example embodiment of the present invention.

Referring to FIGS. 4, 5A, 5B and 5C, the support structure 200 includes first 202 and second 204 opposed ends. Referring to FIGS. 3 and 4, the support structure 200 is pivotally couplable to a support bracket 210 that is mountable to a portion of the foldable frame 108 of the wheelchair. In an example embodiment, the support bracket 210 is disposed on a rear portion of the foldable frame 108 defining the backrest of the wheelchair 106. The support bracket 210 is disposed generally proximate a juncture between the backrest 106 and the seat 104 (shown in FIG. 6A). The support bracket 210 includes a plate portion 212 that is mountable to the foldable frame 108 with at least one fastener 214, such as a screw, bolt, or like device. Fastener 214 preferably replaces existing fasteners fastened to the wheelchair 102. By using the pre-existing mounting holes or fastening points on an existing wheelchair, the present invention is easily and quickly retro-fittable to variety of wheelchairs without the need to make modifications such as drilling holes.

In one example embodiment, plate portion 212 may have a generally arcuate or curved shape to accommodate the foldable frame 108 of the wheelchair 102. The support bracket 210 also includes a flange portion 216 traversing away from an outer surface of the plate portion 212. A fastener 218 and coupler 219 pivotally couples the support structure 200 to the flange portion 216 of the support bracket 210. Any fastener may be used, such as a bolt and nut that would permit pivotal movement between the support structure 200 and the flange portion 216.

To facilitate locking and unlocking the drive wheels 110*a* and 110*b* of the wheelchair 102, the support structure 200 includes at least one braking lever 250 and at least one sensing lever assembly 300 extending away from the first 202 and second 204 ends respectively. Only one brake mechanism 100*a* or 100*b* is necessary to accomplish the desired braking function of the wheelchair 102. However, it is most common to pair a first 100*a* and a second 100*b* braking mechanism with the opposing wheels 110*a* and 110*b*. It should be noted that the operation of braking mechanism 100*a* is separate and not dependant on operation of braking mechanism 100*b*, and vise-versa. The independent operation is facilitated, in part, by each brake mechanism 100*a* and 100*b* having its own respective sensing lever assembly 300.

Figure 5A:
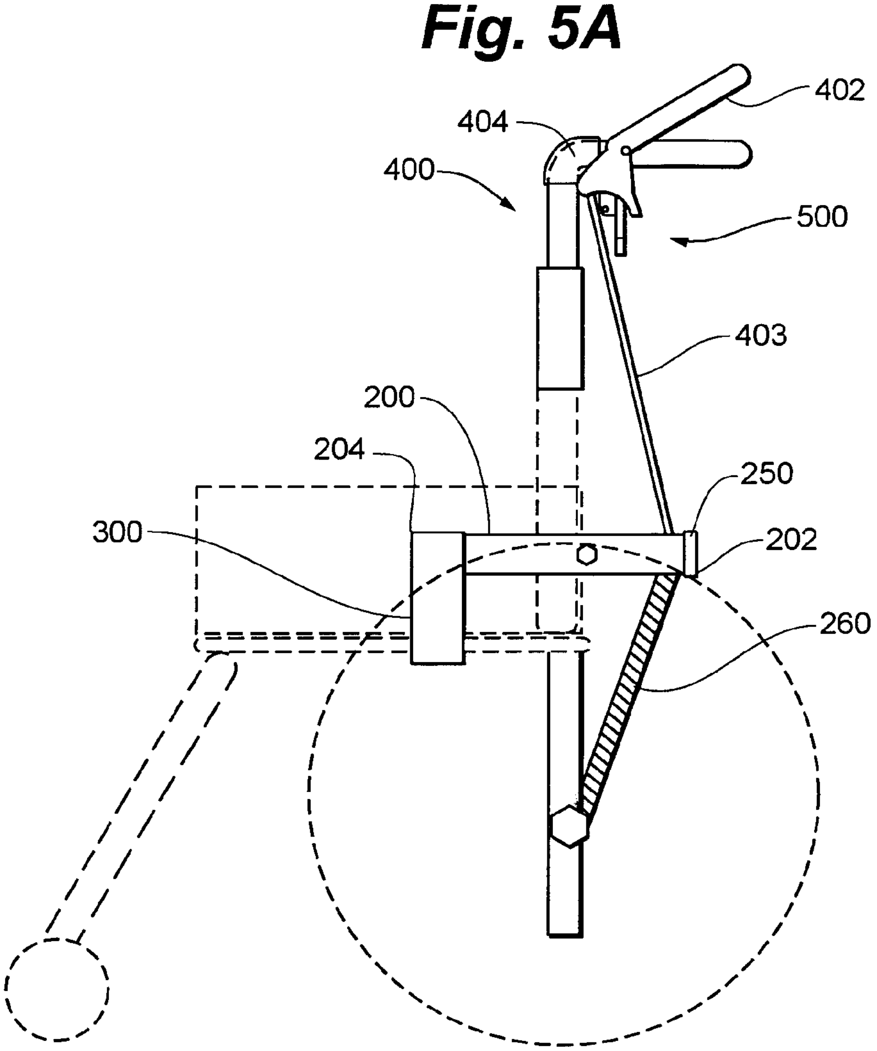
FIG. 5A is a side view of a wheelchair brake mechanism in an engaged position according to an example embodiment of the present invention.
Figure 5B:
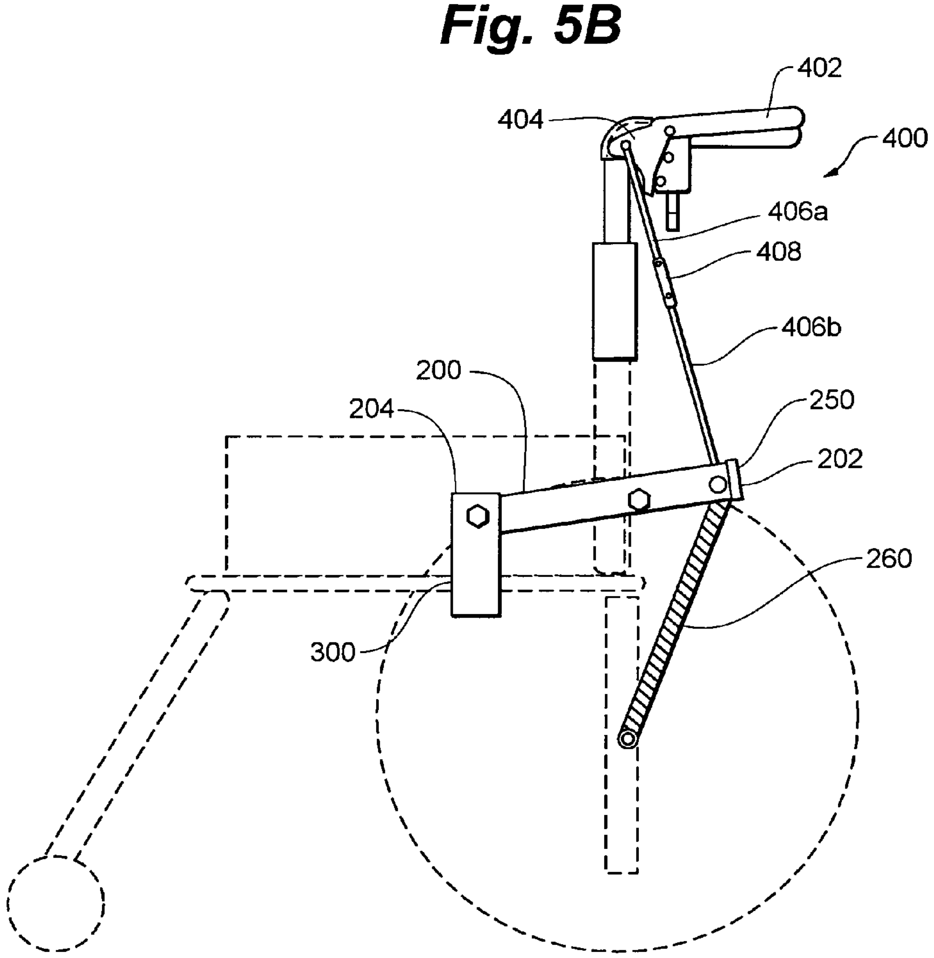
FIG. 5B is a side view of a wheelchair brake mechanism in a disengaged position according to an example embodiment of the present invention.
Figure 5C:
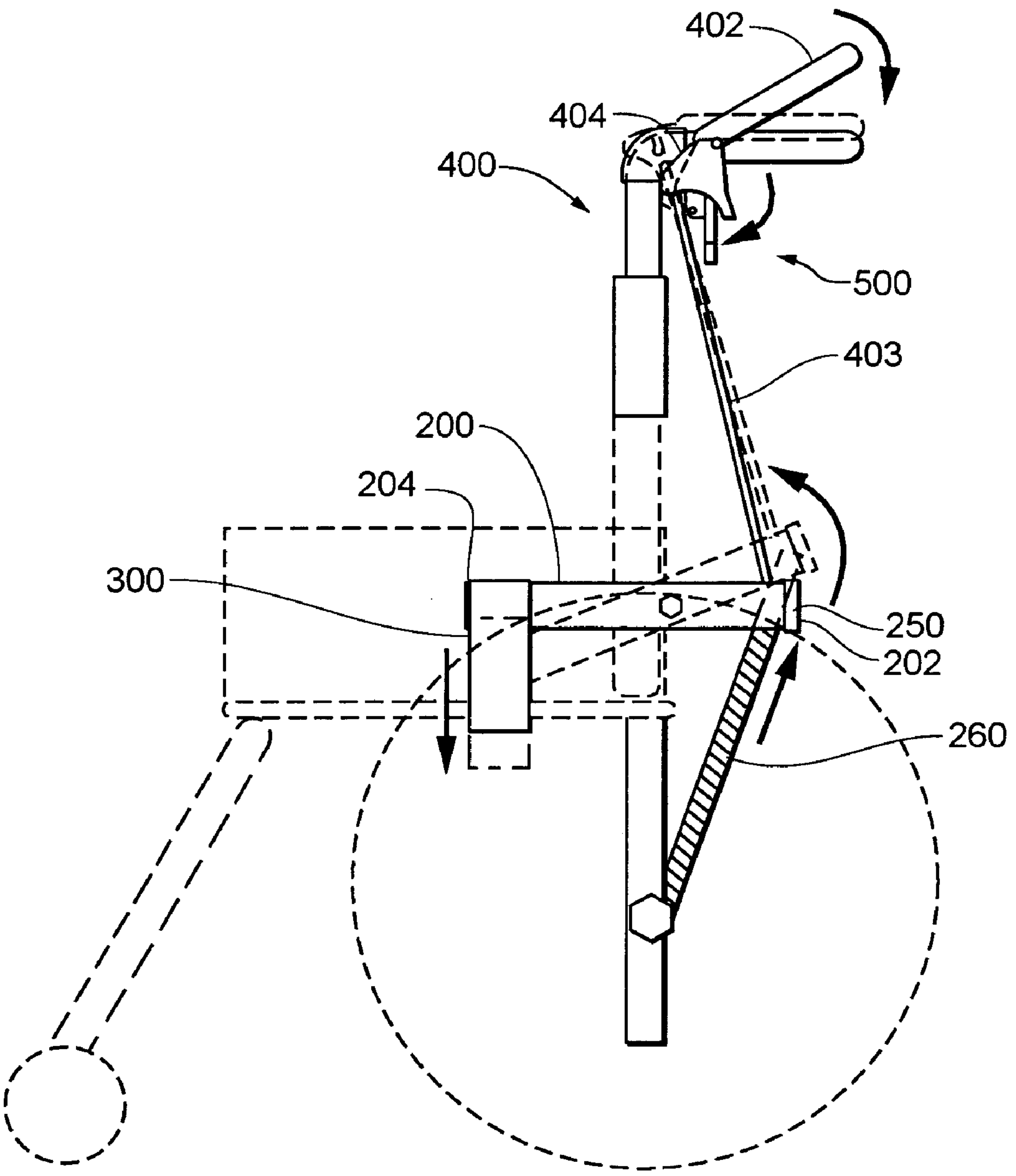
FIG. 5C is a side view of a wheelchair brake mechanism in an engaged position and showing how portions of said mechanism move to a disengaged position according to an example embodiment of the present invention.

The braking assembly has a default engaged position, as illustrated in FIG. 5A, and disengaged position, as illustrated in FIG. 5B. FIG. 5C shows the engaged position with the disengaged position superimposed along with directional arrows indicating the direction of movement of the indicated components. In the engaged position, braking lever 250 is disposed adjacent to and confronts a portion of the drive wheel 110*a* preventing it from rotating freely. In the disengaged position, the braking lever 250 is disposed sufficient distance away from the drive wheel 110*a* to allow it to freely rotate. Sensing lever assembly 300 facilitates rotational movement or pivoting of the support structure 200 from the engaged position toward the disengaged position when a user is entering or leaving the wheelchair 102.

Referring back to FIGS. 3 and 4, braking lever 250 traverses away from the support structure 200 and extends generally toward the drive wheel 110*a*. In one example embodiment, the braking lever 250 extends away from the support structure 200 at generally a ninety-degree angle, such that the support structure 200 has a generally L-shape. Other angles and shapes such as C-shaped, J-shaped, S-shaped and other similar shapes are also envisioned to be within the spirit and scope of the invention. In one example embodiment of the invention, the braking lever 250 is integral to the support structure 200. In other embodiments of the invention the braking lever 250 may be detachably coupled to the support structure 200 to permit modification according to the wheelchair 102 being outfitted with the brake mechanism 100*a*.

Braking lever 250 comprises a generally rectangular plate or bar having a length generally greater than a width of the drive wheel 110*a*. The braking lever 250 also has an upper peripheral edge portion 252 and a lower peripheral edge portion 254. The lower peripheral edge portion 254 engages or confronts the drive wheel 110*a* when the support structure 200 is in the engaged position. In an example embodiment, the lower peripheral edge portion 254 is generally linear however; it may also have a generally curvilinear or arcuate shape such that it mimics the arcuate shape of the drive wheel 110*a*. The generally arcuate shape provides more surface contact between the braking lever 250 and the drive wheel 110*a*, thereby increasing rotational resistance.

Continuing with FIGS. 3–5C, the brake mechanisms 100*a* and 100*b* include a biasing or tension member 260 such as a coiled spring or adjustable elastomeric strap that is coupled to and extends generally between either the support structure 200 and a portion of the foldable frame 108 or between the braking lever 250 and a portion of the foldable frame 108. The biasing member 260 maintains support structure 200 in the default engaged position, as illustrated in FIG. 5A, when a user is not seated in the seat 104 of the wheelchair 102. By having the engaged position as the default position, the drive wheels 110a and 110b remain locked when the user is not seated, thereby immobilizing the wheelchair 102 and providing a stable structure for the user. Since the wheelchair 102 is immobilized, a user entering or leaving the seat 104 of the wheelchair 102 will have a significantly reduced chance of falling due to the wheelchair 102 coming out from under them.

Referring back to FIGS. 3 and 4, the biasing member 260 includes a first end 262 and a second end 264. The first end 262 is detachably coupled to either the braking lever 250 or the support structure 200. In one example embodiment, the second end 264 is detachably coupled to a portion of the foldable frame 108 such as illustrated in FIG. 3. In this example embodiment, the second end 264 of the biasing member 260 includes a hook or S-shape hook member 265 attached thereto to facilitate detachable coupling of the biasing member 260 to a portion of the foldable frame 108. The second end 264 of the biasing member 260 may be detachably coupled to a portion of the axle assembly 275 of the drive wheel 110a extending through a portion of the foldable frame 108 and secured thereto by a coupler 276 such as a nut or similar component. However, the second end 264 of the biasing member 260 may be attached anyplace on the wheelchair 102 that facilitates its ability to maintain the support structure 200 in the engaged position.

In other example embodiments of the invention, the second end 264 of the biasing member 260 is coupled to an adjustable coupler 270 that is coupled to a portion of the foldable frame 108 to permit a user to adjust its length and thereby the tension that the biasing member 260 exerts upon the support structure 200. In one example embodiment of the invention, as illustrated in FIG. 4, the adjustable coupler 270 may include a turnbuckle portion 272 and a threaded eyelet or hook portion 274. Rotation of the threaded eyelet portion 274 in a clockwise direction shortens the length of the adjustable coupler 270, thereby requiring the biasing member 260 to be stretched in order for the threaded eyelet portion 274 to be coupled to the foldable frame 108.

In another example embodiment, the biasing member 260 comprises an elongate generally elastomeric strap 260 having a plurality of spaced apertures or holes extending along a length thereof. In this example embodiment, adjustment is accomplished by changing the engagement point of the S-shaped hook 265 (or similar engagement device) to different apertures provided in the elastomeric strap. Other types of adjustable couplers 270 are also contemplated and considered to be within the spirit and scope of the present invention.

As the user is seated, the support structure 200 moves from the engaged position to the disengaged position. Returning to FIGS. 5A though 5C, the sensing lever assembly 300 is operably coupled to the support structure 200 and positionable beneath the seat 104 to sense when a user is entering or leaving the wheelchair 102. In one example embodiment, as a user enters the wheelchair 102 the seat 104 travels in a downward vertical direction until it confronts and vertically displaces the sensing lever assembly 300. The downward movement of the sensing lever 300 assembly causes the support structure 200 to pivot or rotate from the engaged position toward the disengaged position. In the engaged position, the drive wheel 110a is locked and not freely rotatable. With the user is seated, the support structure 200 in the disengaged position and the wheelchair 102 is freely moveable.

Various configurations are contemplated for actuating the sensing lever assembly 300. In one example embodiment, as illustrated in FIGS. 6A, 6B, 6C and 7, the sensing lever assembly 300 comprises a sensor bracket 310 having leg portion 312 pivotally coupled to the support structure 200 and a foot portion 314 transversely extending therefrom that is in operable communication with the seat 104 of the wheelchair 102. The leg portion 312 is generally vertically or perpendicularly oriented with respect to a longitudinal axis of the support structure 200. The foot portion 314 is oriented at a generally ninety degree angle with respect to the leg portion 312 such that the sensor bracket 310 has a generally L-shape. However, other shapes are also contemplated for the sensor bracket 310, including but not limited to C-shaped, U-shaped, and J-shaped. Regardless of the shape utilized, the sensor bracket 310 is oriented such that the foot portion 314 extends generally beneath a portion of the foldable frame 108 defining the seat 104 of the wheelchair 102.

Depending upon the weight of the user, it may be advantageous to be able to adjust the distance between the seat 104 of the wheelchair 102 and the foot portion 314. For example, a smaller user weighing less may need to decrease the distance to facilitate the seat 104 of the wheelchair 102 engaging the foot portion 314. A larger user weighing more may increase the distance to permit the user to become fully seated in the wheelchair 102 before the support structure 200 moves from the engaged position to the disengaged position.

In one example embodiment of the invention, as illustrated in FIGS. 6A, 6B, 6C and 7, a seat engagement assembly 350 is operably disposed on the foot portion 314 to facilitate adjustment of the distance between the seat 104 of the wheelchair 102 and the foot portion 314. As particularly illustrated in the example embodiment of FIG. 7, the seat engagement assembly 350 comprises a stop 352 having a saddle portion 354 and a shaft portion 356 adjustably disposed on the foot portion 314. The saddle portion 354 has a generally arcuate or curvilinear shape to accommodate a tubular shape of the foldable frame 108. The shaft portion 356 may be threadedly coupled to the foot portion 314, such that rotation of the shaft portion 356 adjusts the height of the stop 352 and thus the distance between the seat 104 of the wheelchair 102 and the foot portion 314. At least one threaded nut, bolt or similar component 358 may be disposed on the shaft portion 356 to secure the stop 352 at a particular height with respect to the foot portion 314. As particularly illustrated in FIG. 7, a plurality of threaded nuts is utilized to secure the stop 352 to the foot portion 314. Other embodiments of the seat engagement assembly 350 may also be utilized. For example, a cable having a pair of opposed ends coupled to the support structures 200 of the braking mechanisms 100a and 100b may be used. An adjustable pneumatic cylinder and piston rod may also be utilized.

Figure 6A:
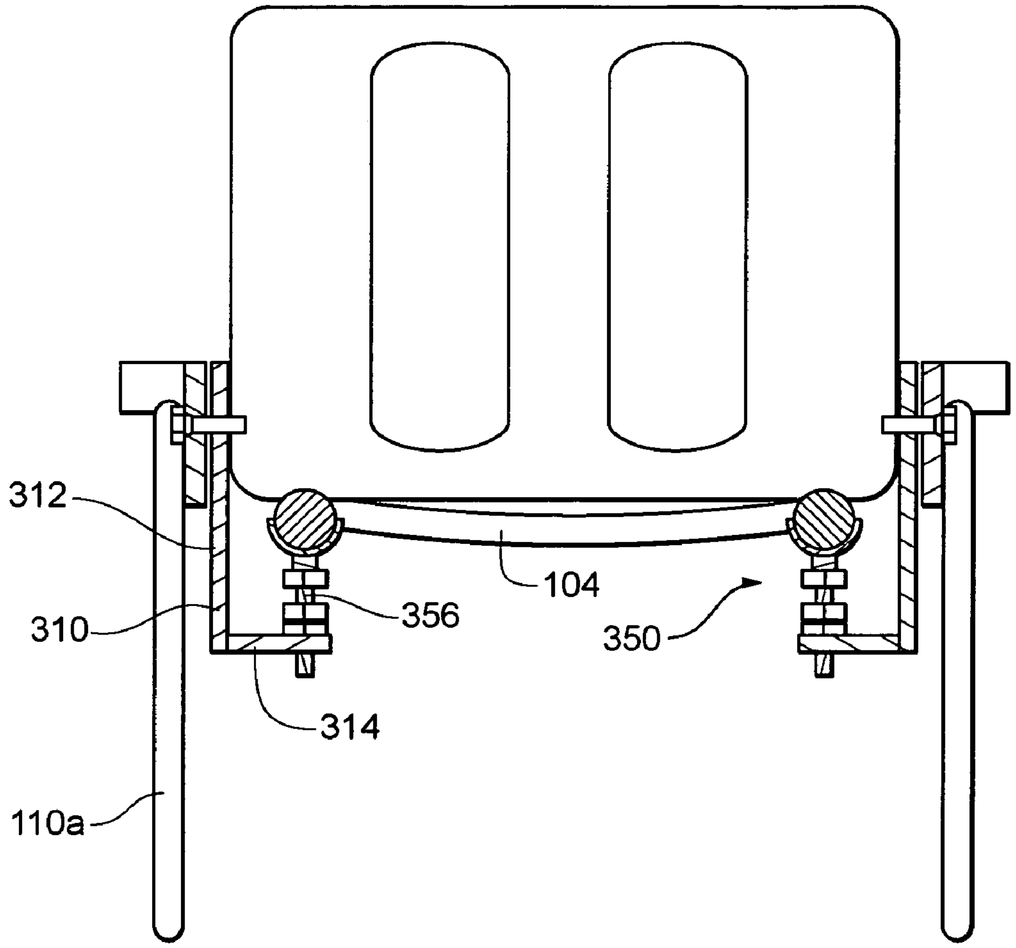
FIG. 6A is rear partial cross section view of a wheelchair brake mechanism in an engaged position according to an example embodiment of the present invention.
Figure 6B:
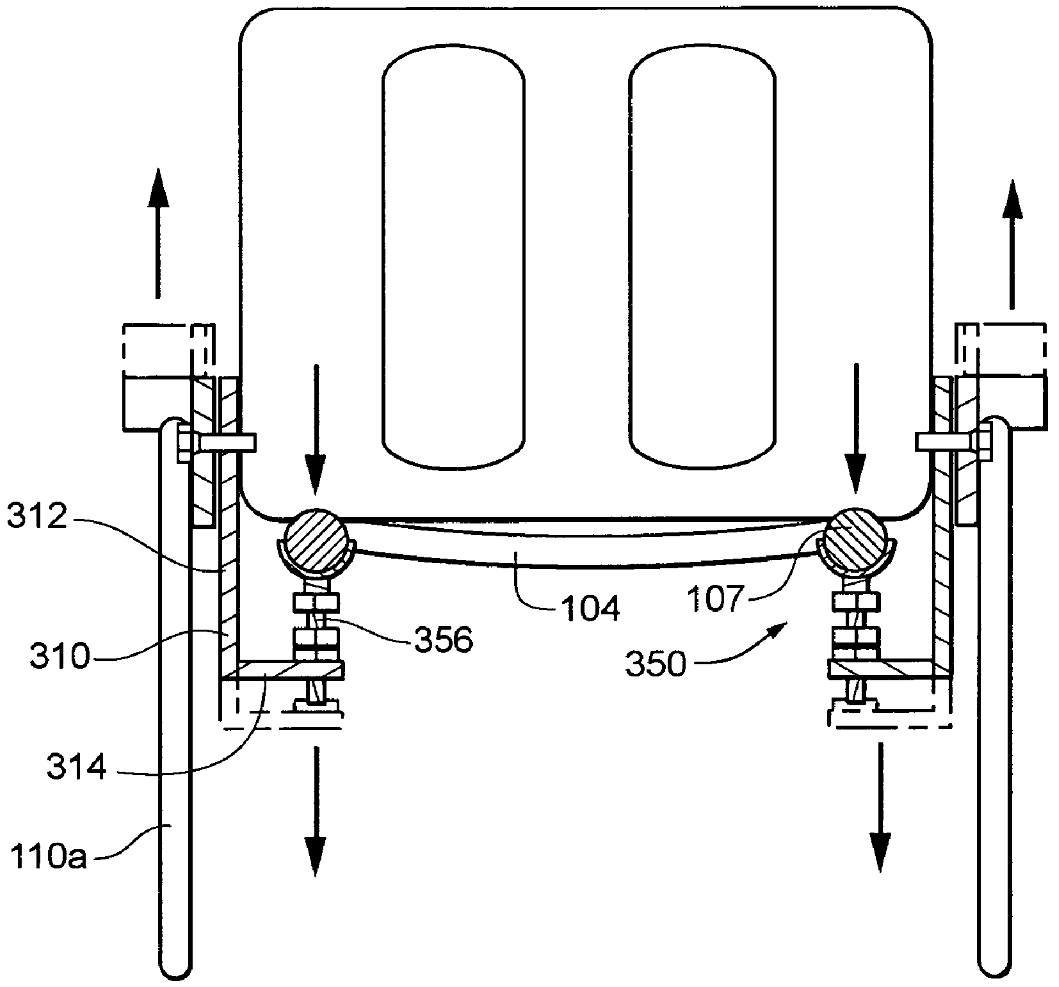
FIG. 6B is rear partial cross section view of a wheelchair brake mechanism in an engaged position and showing how portions of said mechanism move to a disengaged position according to an example embodiment of the present invention.
Figure 6C:
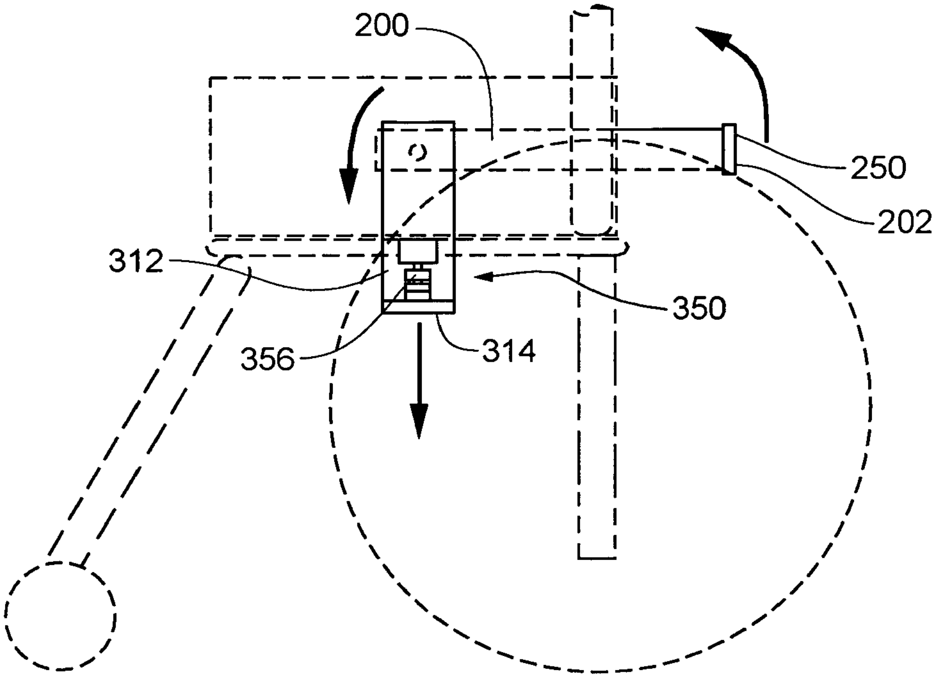
FIG. 6C is a side view of a wheelchair brake mechanism in an engaged position showing how portions of said mechanism move to a disengaged position according to an example embodiment of the present invention
Figure 7:
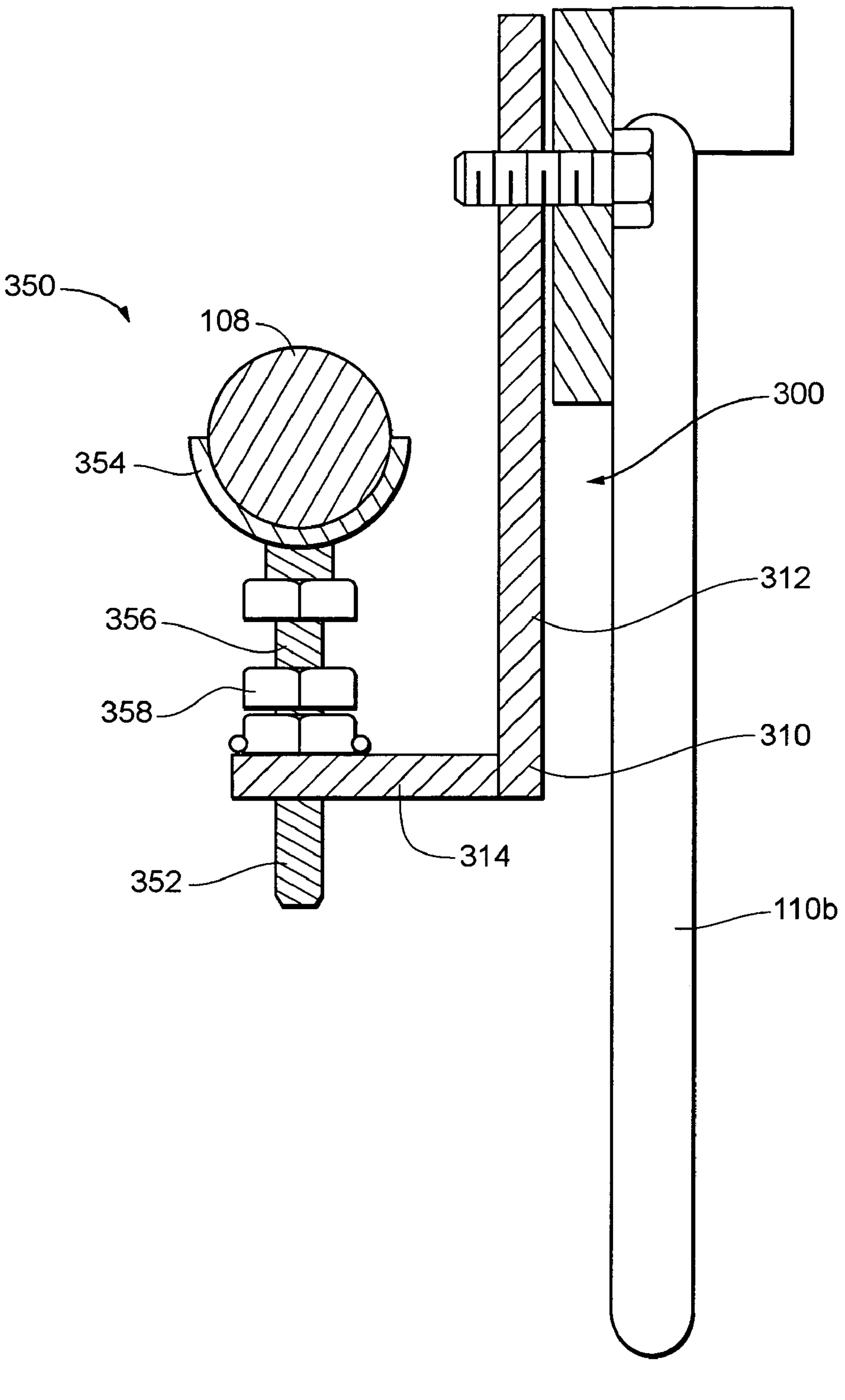
FIG. 7 is an enlarged view of FIG. 6A according to an example embodiment of the present invention.

FIG. 6A shows the sensing lever assembly 300 in the position where the wheel is engaged and no movement is possible. This position corresponds with an absence of a patient seated in the chair. When the patient sits on the seat, the rails 107 of the foldable frame 108 move downward as indicated by the arrows in FIGS. 6B and 6C. The downward movement of the rails causes the seat engagement assembly 350 to move the sensing lever assembly 300 downward as shown, which, in turn, causes the wheel to be released for free movement.

A wheelchair 102 with brake mechanisms 100*a* and 100*b* may be further enhanced by providing a means for bypassing the brake mechanism 100*a* and 100*b* when a user is not seated in the wheelchair 102. Such bypass means makes it easier for an attendant to transport an empty wheelchair that would otherwise have the brake mechanisms 100*a* and 100*b* engaged. In example embodiments, as illustrated in FIGS. 3, 5A, 5B, 5C, 8A–12, and 17–18, a brake release assembly 400 is coupled to the foldable frame 108 and operably coupled to the support structure 200. In one of the example embodiments, the brake release assembly 400 comprises at least one hand release lever 402 pivotally couplable to handles of the wheelchair 102. A linkage 403 is coupled to and extends between the hand release lever 402 and the support structure 200 or braking lever 250. The hand release lever 402 is pivotable between a depressed position or state and released position or state. As an attendant depresses the hand release lever 402 toward the depressed state it pivots the support structure 200 from the engaged position toward the disengaged position. As an attendant releases the hand release lever 402 from the depressed state toward the released stated, the support structure 200 pivots from the disengaged position toward the engaged position.

Figure 8A:
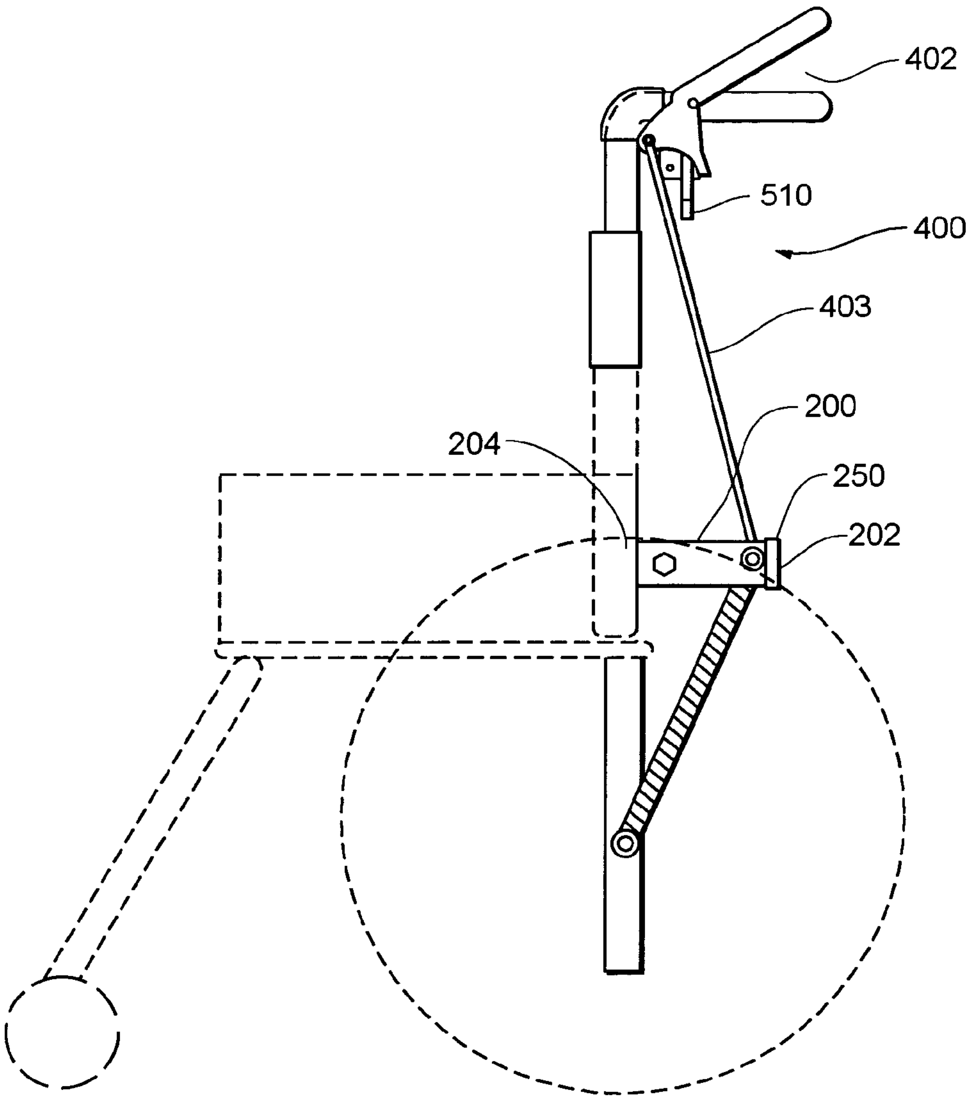
FIG. 8A is a side view of another embodiment of a wheelchair brake mechanism in a disengaged position according to an example embodiment of the present invention.
Figure 8B:
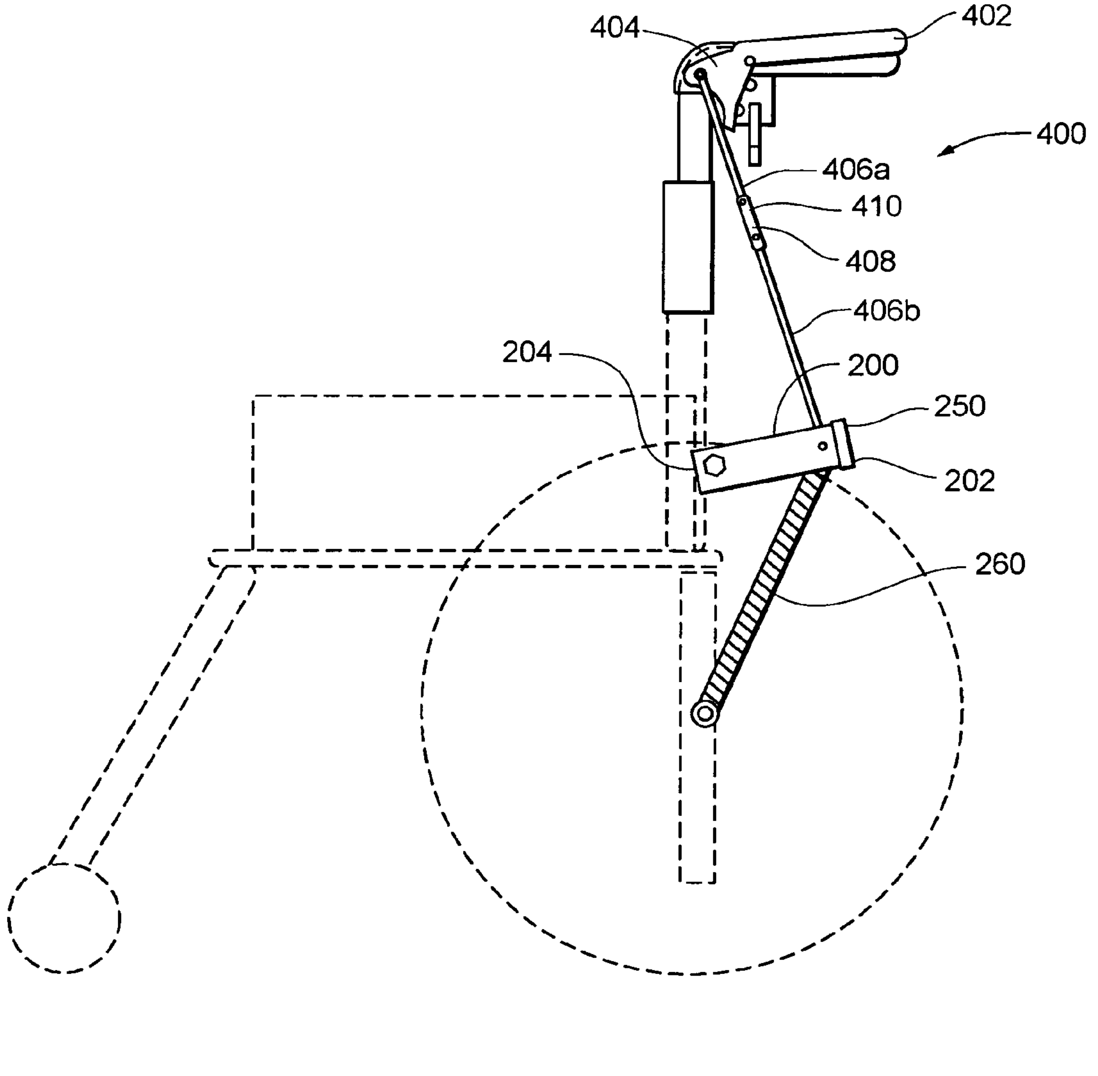
FIG. 8B is a side view of another embodiment of a wheelchair brake mechanism in an engaged position according to an example embodiment of the present invention.
Figure 9:
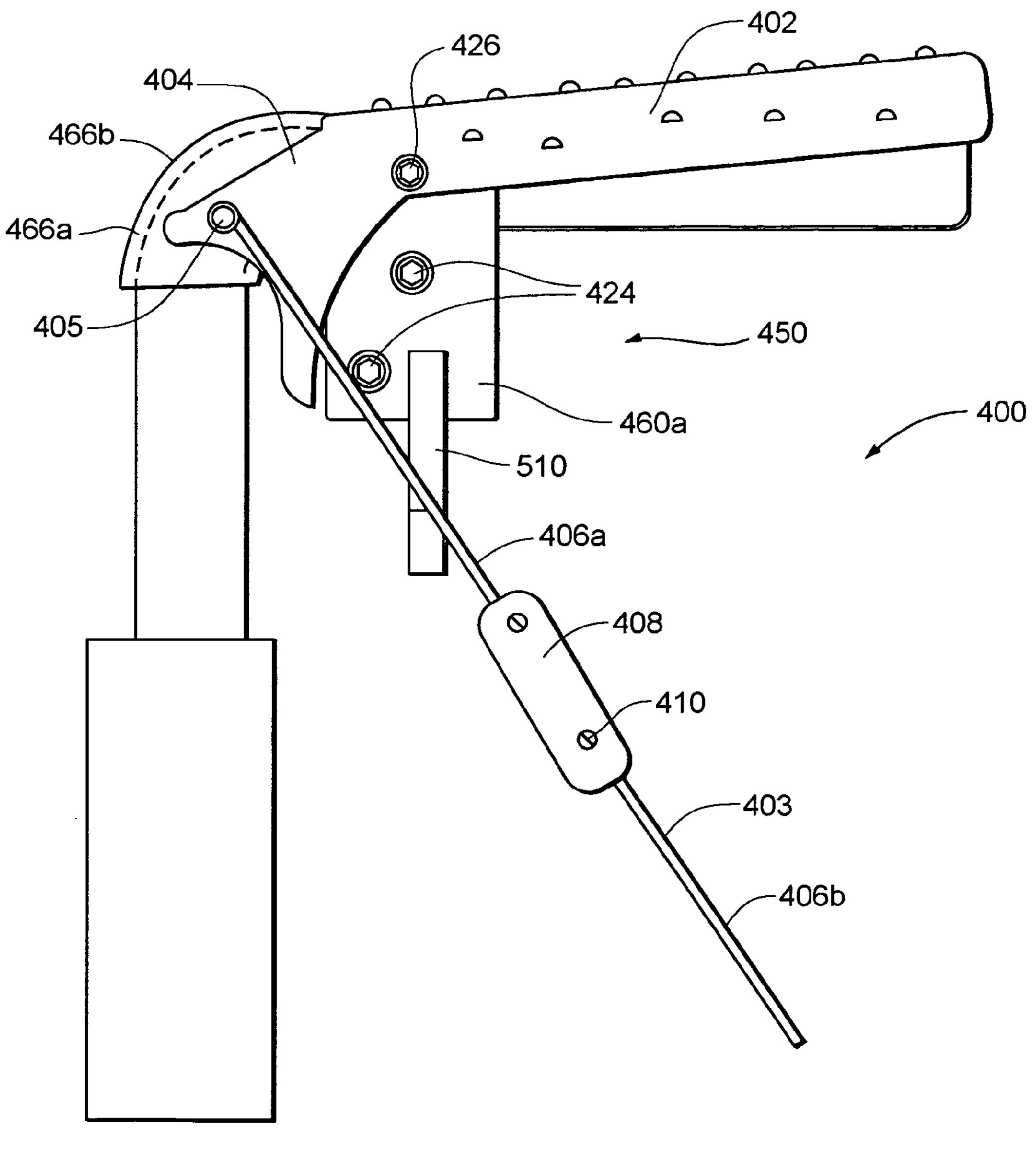
FIG. 9 is a side view of an attendant controlled brake release assembly of a wheelchair brake mechanism according to an example embodiment of the present invention.

Referring now to FIGS. 5A–10B and particularly to FIG. 9, the hand release lever 402 includes at least one flange 404 having an aperture or hole 405 for attaching at least one end of the linkage 403. A second end of the linkage 403 is detachably coupled to the support structure 200 or braking lever 250. In one example embodiment, the hand release lever 402 is preferably disposed generally above the handle of the wheelchair 102 to allow gravity to assist an attendant in applying the hand release lever 402.

In one example embodiment of the invention, the hand release lever 402 may be manufacture from stainless steel. Additionally, the hand release lever 402 may have a generally textured outer surface and/or a contoured surface to facilitate gripping and/or comfort for an attendant grasping the hand release lever 402. Other configurations, materials and texturing are also contemplated by the present invention. Other materials may include aluminum, composite, polymer, or similar materials.

The linkage 403 comprises a generally rigid rod or wire according to one embodiment. Linkage 403 may be manufactured from various other materials such as steel, aluminum, titanium, composite polymer, or fabric. Any device that would link the hand release lever 402 and the support structure 200 may be used and is contemplated by the present invention.

A length adjustor 408 may be desirably disposed between a pair of linkage portions 406*a* and 406*b* to adjust an overall length of the linkage 403. The length adjustor 408 is used because the distance between the handles of the wheelchair 102 and the placement of the support structure 200 may vary depending upon the manufacturer of the wheelchair 102. The length adjustor 408 may comprise an elongate tube or cylinder having opposed open ends extending into an interior space thereof. Free ends of the linkage portions 406*a* and 406*b* may extend into the open ends of the length adjustor 408. Fasteners 410, such as screws, bolts or similar components may extend into the length adjustor 408 to engage and secure the linkage portions 406*a* and 406*b* in the interior of the length adjustor 408. Other devices such as turnbuckles may also be used to adjust the overall length of the linkage 403.

Figure 10A:
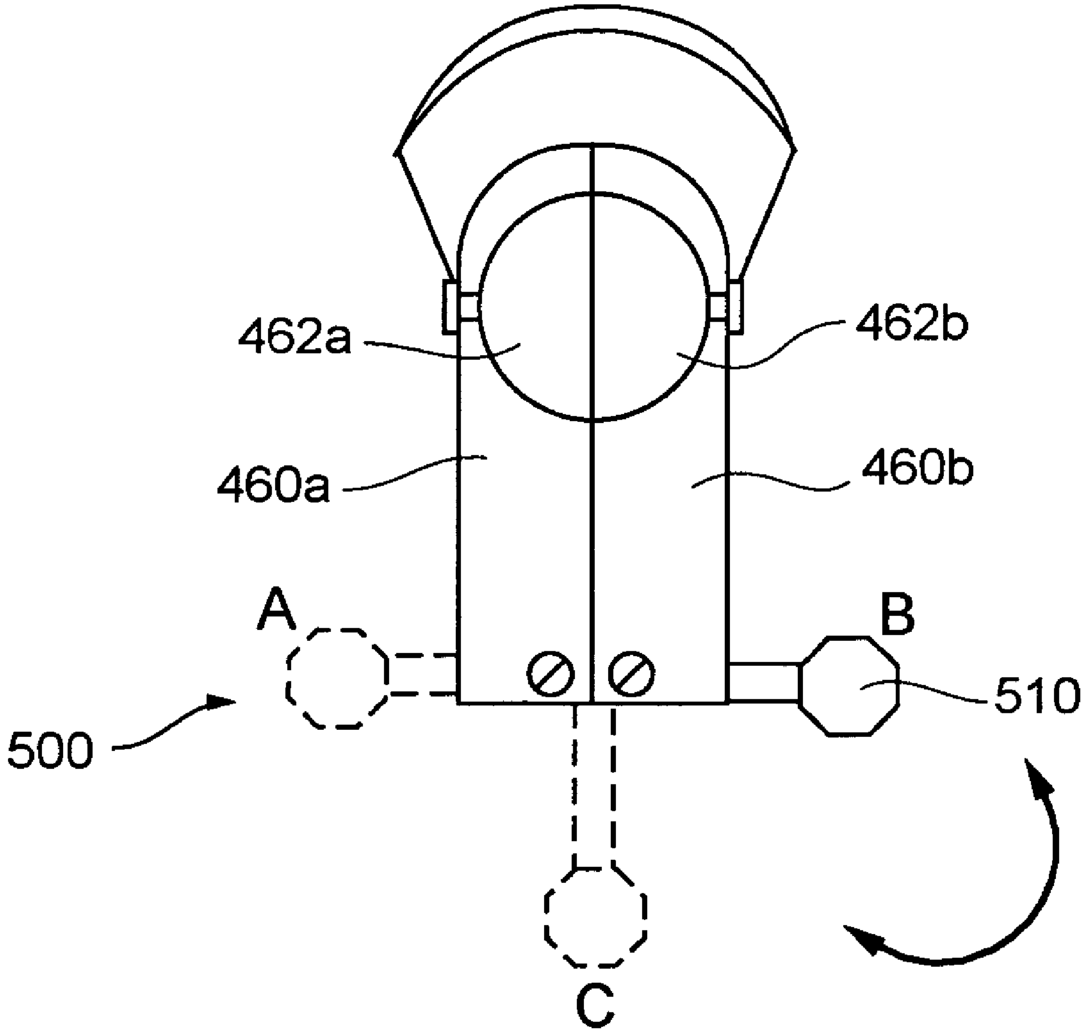
FIG. 10A is an end view of an attendant brake release assembly of a wheelchair brake mechanism according to an example embodiment of the present invention.
Figure 10B:
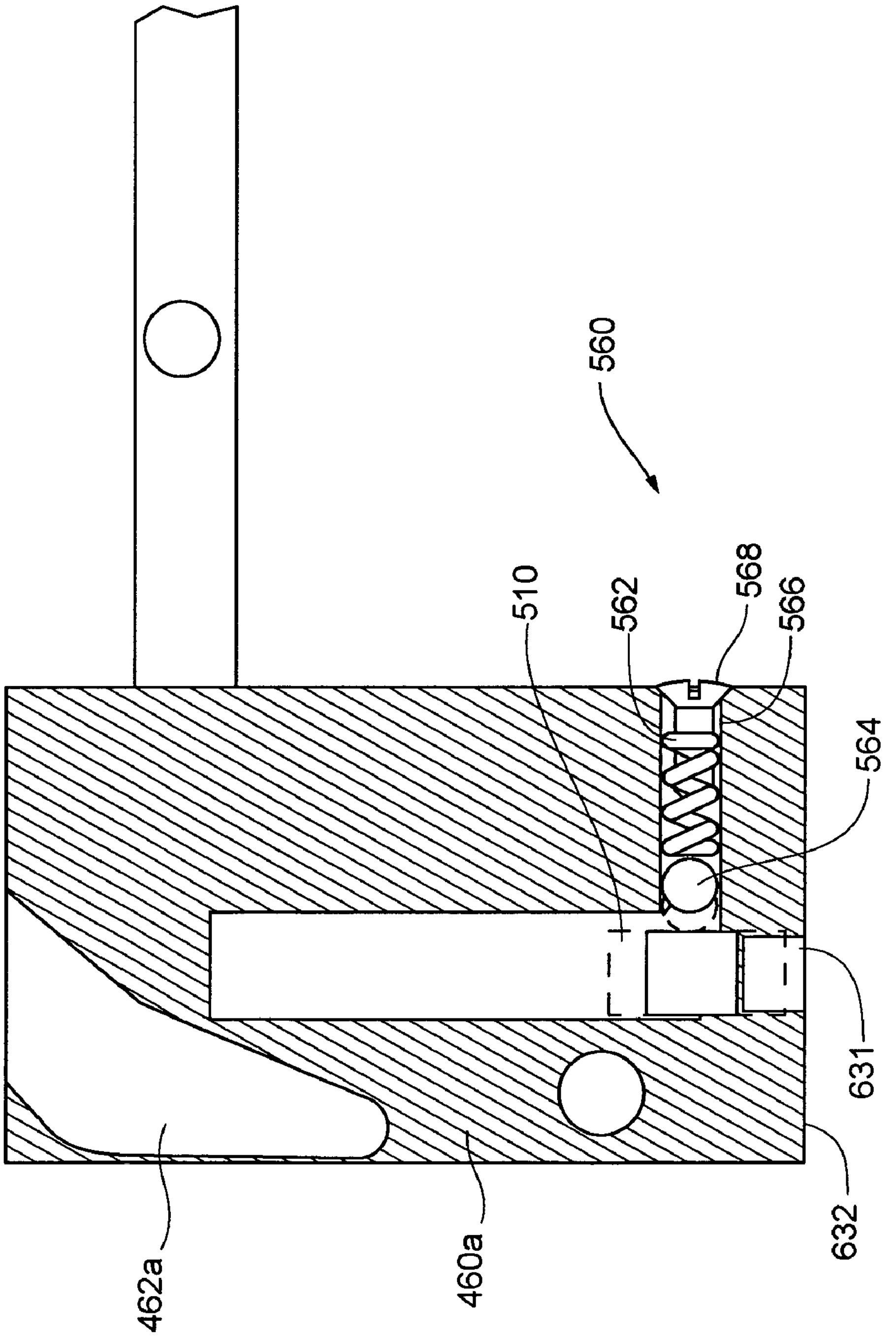
FIG. 10B is a cross section view of an attendant brake release assembly of a wheelchair brake mechanism according to an example embodiment of the present invention.

In another example embodiment, a brake release coupling assembly 450 is provided to facilitate coupling the brake release assembly 400 to the wheelchair 102 without having to modify the wheelchair 102. In this example embodiment, as illustrated in FIGS. 8A–10C and particularly FIG. 10A, the brake release coupling assembly 450 comprises a pair of coupling members 460*a* and 460*b* detachably coupled together about the handle of the wheelchair 102. Referring to FIGS. 10A and 10B, each of the coupling members 460*a* and 460*b* includes a groove, recess or channel 462*a* and 462*b* extending into an inner surface thereof for receiving the foldable frame 108 defining the handles of the wheelchair 102. As illustrated in FIG. 10A, when the coupling members 460*a* and 460*b* are coupled together grooves 462*a* and 462*b* define an aperture extending through at least a portion of the coupling members 460*a* and 460*b*. As particularly illustrated in FIG. 10B, each of the grooves 462*a* and 462*b* has a generally arcuate shape to accommodate the arcuate shape of the foldable frame 108. The grooves 462*a* and 462*b* may have various shapes, such as a generally linear or an approximately right angle depending upon the shape of the foldable frame 108.

In another example embodiment, as illustrated in FIG. 9, each of the coupling members 460*a* and 460*b* may include a shoulder portion 466*a* and 466*b* respectively extending generally curvilinearly away therefrom. The grooves 462*a* and 462*b* of the coupling members 460*a* and 460*b* may extend along an inner surface of the shoulder portions 466*a* and 466*b* to accommodate a generally arcuate shape of the foldable frame 108. The coupling members 460*a* and 460*b* may be machined from steel, aluminum, polymers, composites and similar materials. Additionally, the hand release lever 402 and the coupling members 460*a* and 460*b* may have a silver ion coating, which has been shown to kill bacteria, viruses and other pathogens.

To assemble the brake release assembly 400 each coupling member 460*a* and 460*b* is positioned adjacent to respective side of the foldable frame 108, such that the handles of the wheelchair 102 extend through the aperture defined by the coupling members 460*a* and 460*b*. Referring again to FIG. 9, fasteners 424, such as screws, bolts and similar components, are utilized to couple the coupling members 460*a* and 460*b* together. The hand release lever 402 is pivotally coupled to the coupling members 460*a* and 460*b* with a fastener 426, such as a screw, bolt and similar components.

Referring generally to FIGS. 5A–5B and 8A–10B, and FIG. 10A in particular, brake release assembly 400 may include a break release locking mechanism 500 operably coupled thereto to permit an attendant to maintain the support structure 200 in the disengaged position. In one example embodiment, a switch 510 is movably disposed to the coupling members 460*a* and 460*b* to selectively confront and prevent pivoting of the hand release lever 402 from the depressed state toward the released state. As discussed above, the support structure 200 is in the disengaged position when the hand release lever 402 is in the depressed state. Referring particularly to FIG. 10B, an end of the switch is pivotally disposed in a notch 631 extending into a lower surface or bottom 632 of each of the coupling members 460*a* and 460*b*.

Referring back to FIG. 10A, the switch 510 is positionable between a first locked position at A, a second locked position at B, and a released position at C. While the switch 510 is in the released position C, the hand release lever 402 will move freely from the depressed state toward the released state. An attendant can temporarily hold the hand release lever 402 in the depressed state by moving the switch 510 to the first locked position A and letting the flange 404 confront the switch 510. The force exerted on the flange 404 by the biasing member 260 acting on the support structure 200 and the linkage 403 keeps the switch 510 in the first locked position A and prevents the hand release lever 402 from pivoting toward the released position.

There are at least two methods for moving the switch 510 from the first locked position to the released C position. The first method occurs when a user sits in the seat 104 of the wheelchair 102. As a user sits down, the support structure 200 pivots from the engaged position toward the disengaged position causing the linkage 403 to at least slightly displace the hand release lever 402. The displacement of the hand release lever 402 reduces the pressure on the switch 510, thereby permitting gravity to act on the switch 510 and move it to the released C position. Permitting movement of switch 510 from the locked position A to the released position C when a user sits in the seat 104 ensures brake mechanism 100*a* will move from the disengaged position toward the engaged position once the user attempts to rise up from the wheelchair 102.

The second method of moving the switch 510 from the first locked position A to the released position C occurs when an attendant depresses hand release lever 402. Once the force created by the biasing member 260 acting on the support structure 200 and linkage 403 is removed from the switch 510, gravity freely moves it toward the released position C.

An attendant can also keep the hand release lever 402 in the depressed stated by moving the switch 510 to the second locked position B and letting the hand release lever 402 confront switch 510. Once switch 510 is placed in the second locked position B, hand release lever 402 will not be able to move toward the released stated even if it is depressed again or a user sits in the seat 104 of the wheelchair 102. The switch 510 is maintained in the second locked position B, by a securing assembly 560 operably disposed in at least one of the coupling members 460*a* or 460*b*.

In one example embodiment, as illustrated in FIG. 10B, the securing assembly 560 comprises a coiled spring or other biasing member 562 disposed in a bore 566 extending through the coupling member 460*a* or 460*b* and into the notch 631. An engagement member 564, such as a ball bearing or similar device, is also disposed in the bore 566 and is biased against a portion of the switch 510 when it is in the second locked position B. The bore 566 may have a diameter slightly smaller than a diameter of the engagement member 564 or it may taper toward the notch 631, such that the engagement member 564 is prevented from completely escaping from the bore 566 when the switch 510 in not in the second locked position B. A fastener 568 may also be threadedly disposed in the bore 566 to facilitate removably retaining the securing assembly 560 in the bore 566. To permit the hand release lever 402 to move from the depressed state toward the released state, and simultaneously move the support structure from the disengaged position toward the engaged position, an attendant forces or pivots switch 510 toward release position C, whereby the biasing member 260 and linkage 403 force the hand release lever 402 to move from the depressed state toward the released state.

Figure 10C:
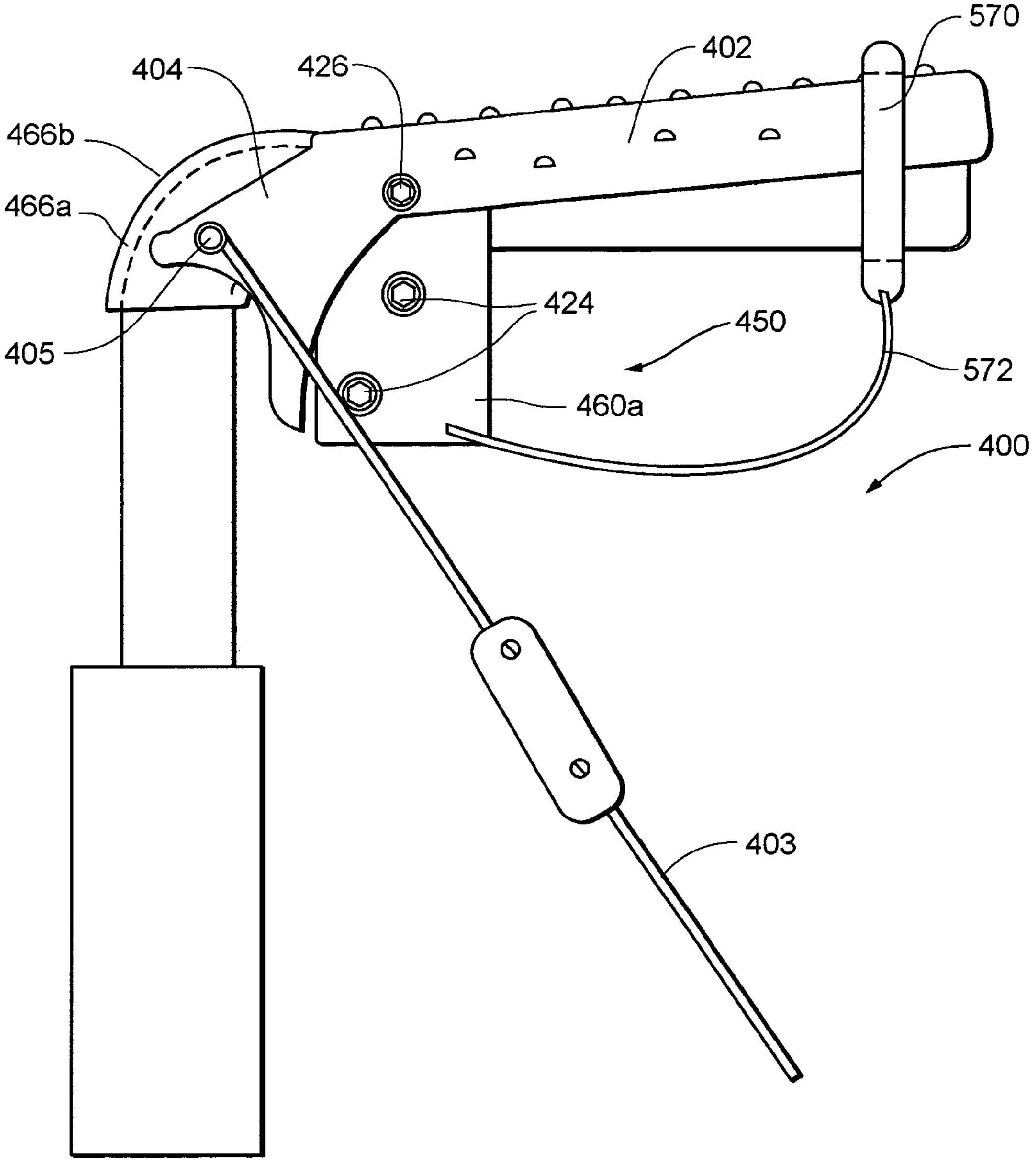
FIG. 10C is a side view of an attendant brake release assembly of a wheelchair brake mechanism according to an example embodiment of the present invention.
Figure 11:
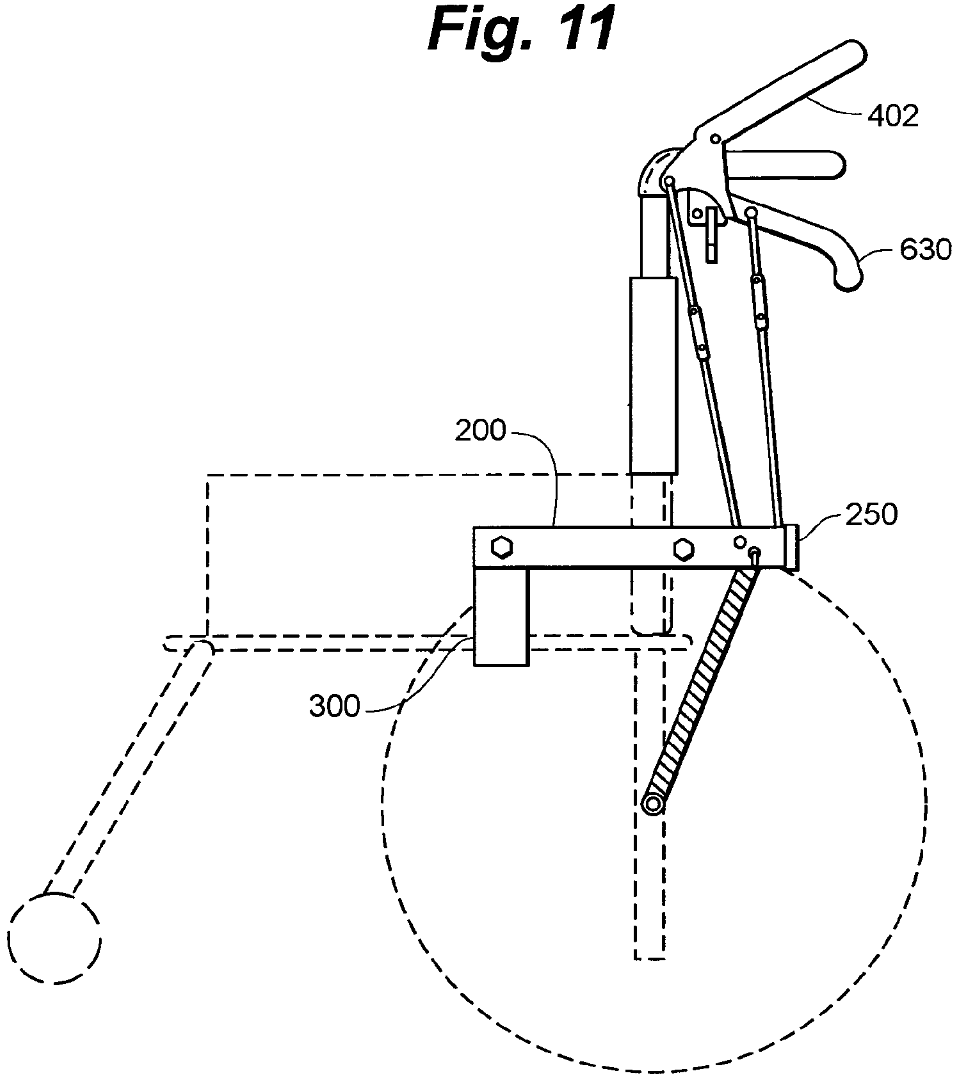
FIG. 11 is a side view of a wheelchair brake mechanism according to an example embodiment of the present invention.
Figure 12:
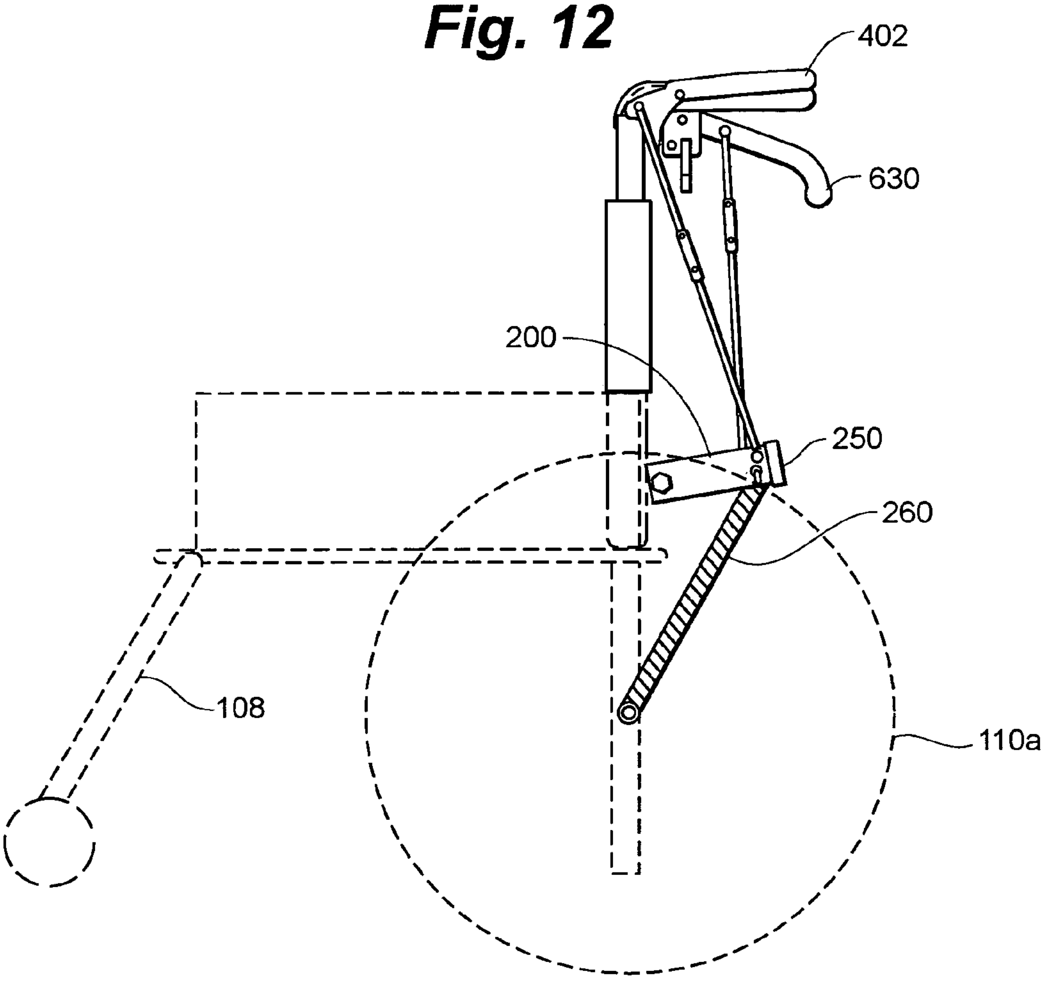
FIG. 12 is a side view of a wheelchair brake mechanism according to an example embodiment of the present invention.

In another embodiment, as illustrated in FIG. 10C, a locking collar 570 may be tethered by a strap 572, chain or similar structure to the coupling portions 460*a* and/or 460*b*. The locking collar 570 is operably couplable about the hand release lever 402 and the handle of the wheelchair 102 when the hand release lever 402 is in the depressed state. The locking collar 570 may comprise an annular ring or plate having an aperture extending therethrough for receiving the hand release lever 402 and the handle of the wheelchair 102. In other embodiments, the locking collar 570 may comprise a plate or ring having a C-shape, U-shape or similar shapes.

In some instances it may not be advisable to have a wheelchair that can move freely when a user or patient is seated; for example, if the patient is suffering from Alzheimer's or other similar diseases that affects a patient's memory. In this instance, as illustrated in FIGS. 8A and 8B, the brake mechanisms 100*a* and 100*b* include only a support structure 200 and a braking lever 250 pivotally coupled to the foldable frame 108. There is no sensing lever assembly 300 to pivot the support structure 200 from the engaged position toward the disengaged position. As discussed above, the biasing member 260 extends between the support structure 200 or braking lever 250 and a portion of the foldable frame 108 to maintain the support structure 200 in the engaged position. When a user sits in the seat 104 of the wheelchair 102 it does not move the support structure 200 and braking lever 250 to the disengaged position.

The brake release assembly 400 may be utilized to facilitate transport of either the patient seated in the wheelchair 102 or an empty wheelchair 102. In this example embodiment, the relationship of a user or patient's position in the seat 104 of the wheelchair 102 does not affect the brake mechanisms 100*a* and/or 100*b*. In this particular example embodiment, securing assembly 560 may not be disposed in the bore 566 of one of the coupling members 460*a* or 460*b*. Instead, a pin or similar structure may be securely or removably disposed therein to prevent the hand release lever 402 from being secured in the depressed state. This arrangement ensures that the wheelchair 102 is always locked unless an attendant is present. An attendant can still temporarily lock hand release lever 402 in position A to transport the wheelchair 102. However, as discussed above, as soon as a user is seated in the wheelchair 102 the switch 510 automatically moves to the released position C to ensure that the wheelchair 102 will be secured if the user attempts to rise up from the wheelchair 102.

Figure 13:
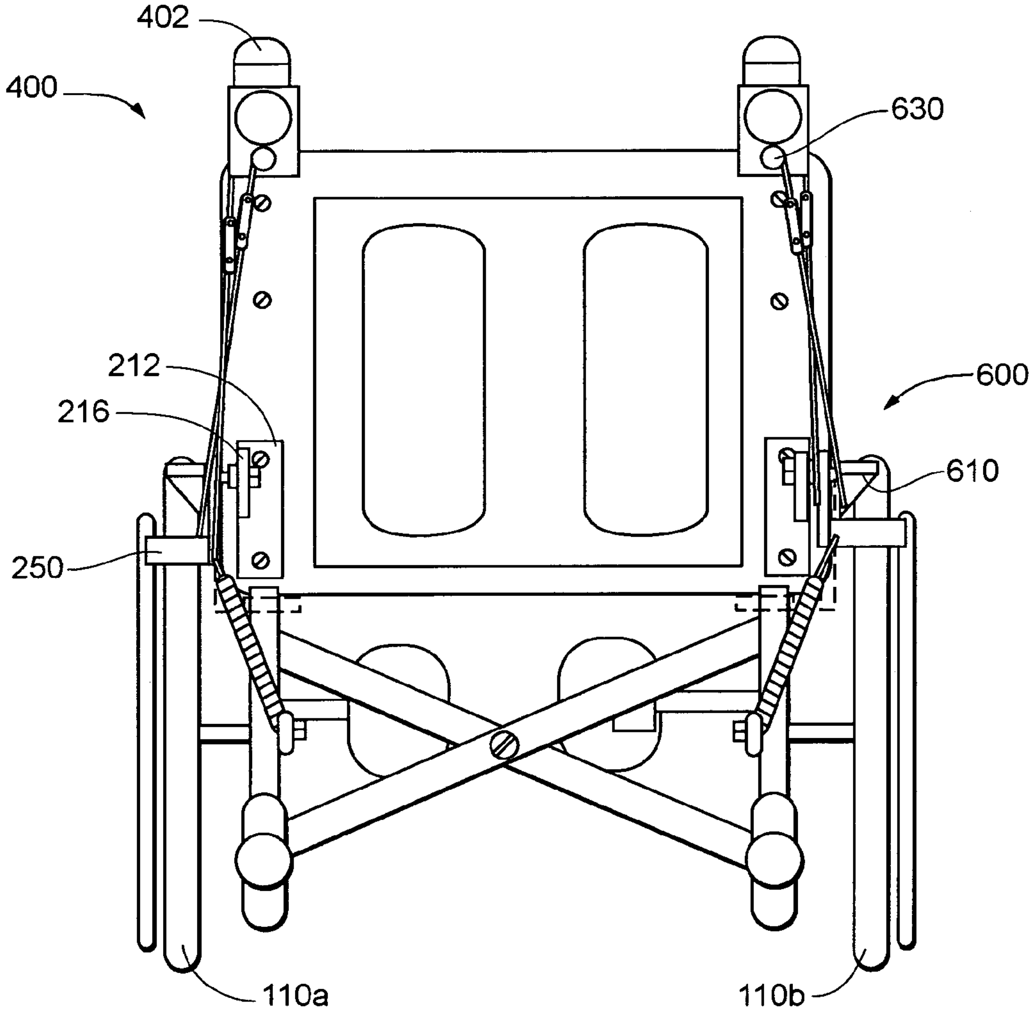
FIG. 13 is a rear view of a wheelchair brake mechanism according to an example embodiment of the present invention.
Figure 14:
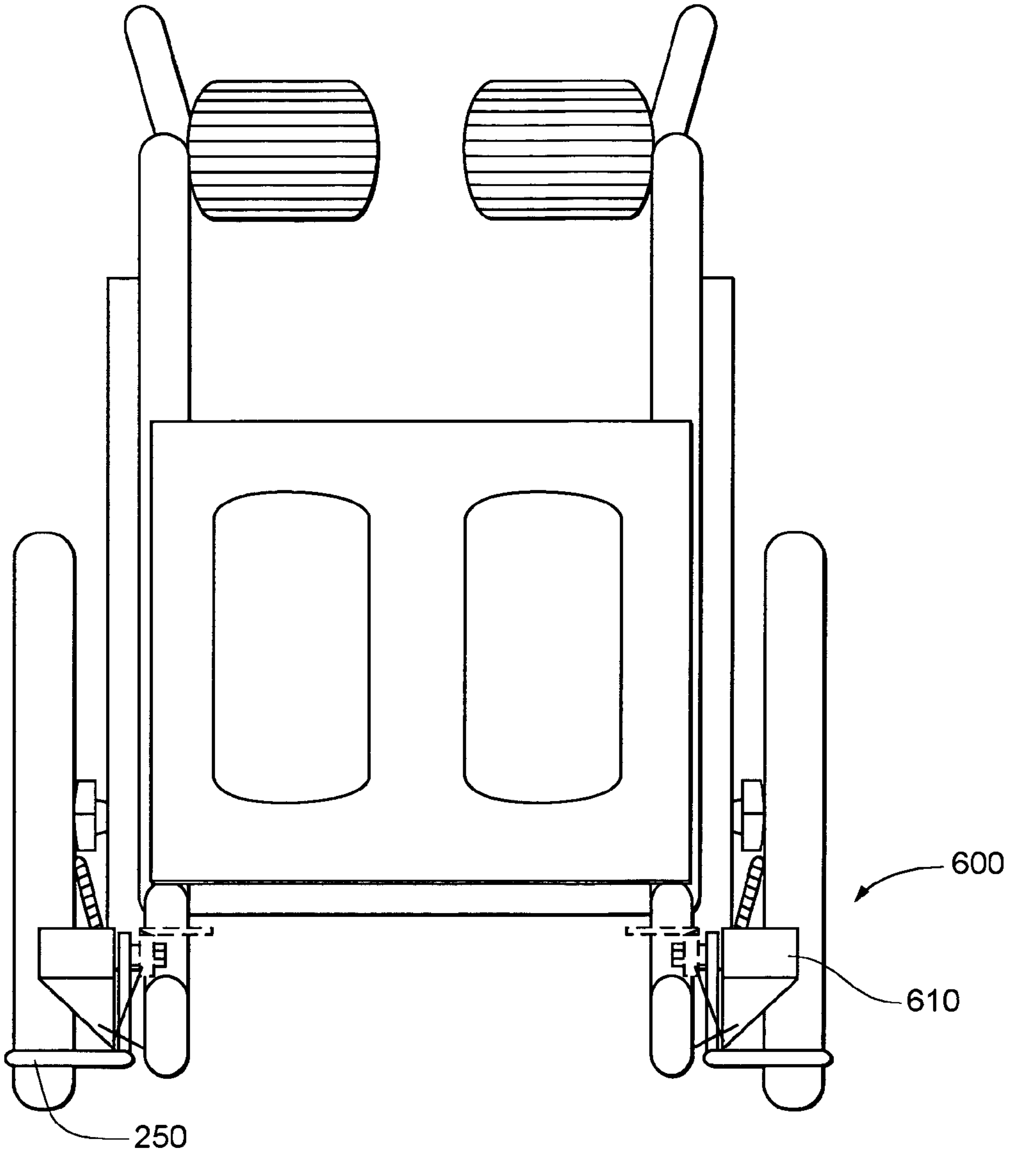
FIG. 14 is a top view of a wheelchair brake mechanism according to an example embodiment of the present invention.
Figure 15:
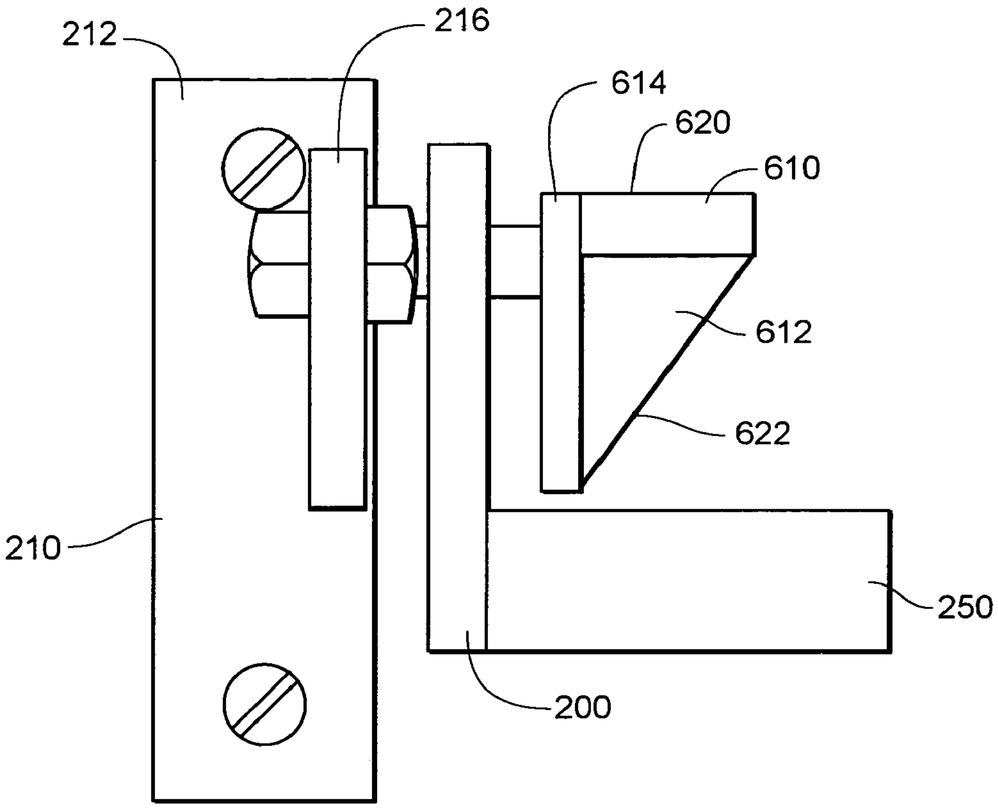
FIG. 15 is an enlarged view of a portion of FIG. 13.

Occasionally, attendants transporting patients in wheelchairs 102 have to maneuver the wheelchairs 102 down an incline, such as a long sloping driveway, or a wheelchair access ramp of a building. Referring to FIGS. 11–18, a friction brake assembly 600 may be coupled to a wheelchair 102 in conjunction with the brake mechanisms 100*a* and 100*b*. Additionally, the friction brake assembly 600 may be used with (FIG. 11) or without (FIG. 12) the sensing lever assembly 300 pivotally coupled to the support structures 200. In one example embodiment, as illustrated in FIGS. 13–15, the friction brake assembly 600 includes a control lever 610 comprising a plate portion 612 disposed adjacent to a top of the drive wheel 110*a* and/or 110*b* and an anchor portion 614. The plate portion 612 is oriented in a generally horizontal plane such that a lower surface of the plate portion 612 confronts the drive wheel 110*a* and/or 110*b* to slow rotation thereof while the wheelchair 102 is moving either on a flat surface or down an incline. In one embodiment, the anchor portion 614 is disposed between the drive wheel 110*a* or 110*b* and the foldable frame 108 and is oriented at a generally right angle to the plate portion 612. However, it is contemplated that the anchor portion 614 may be oriented at any angle with respect to the plate portion 612.

As particularly illustrated in FIG. 15, the anchor portion 614 may be pivotally coupled to the support bracket 210, such that the support structure 200 and the anchor portion 614 have generally the same pivot point. A spacer (not shown) comprising a cylinder, washer or a similar structure, may be disposed between the anchor portion 614 and the support structure 200 to prevent operational interference. The plate portion 612 may have a front edge 620 and rear edge 622 corresponding with a front and rear of the wheelchair 102. The rear edge 622 of the plate portion 612 may have a generally smaller width than the front edge 620 such that the plate portion 612 has a generally triangular shape. The plate portion 612 may have any shape such as generally curvilinear or arcuate to accommodate the curvature of the drive wheels 110*a* and 110*b*. Other shapes and configurations such as C-shaped, U-shaped, V-shaped are also contemplated and considered to be within the spirit and scope of the invention.

Figure 16:
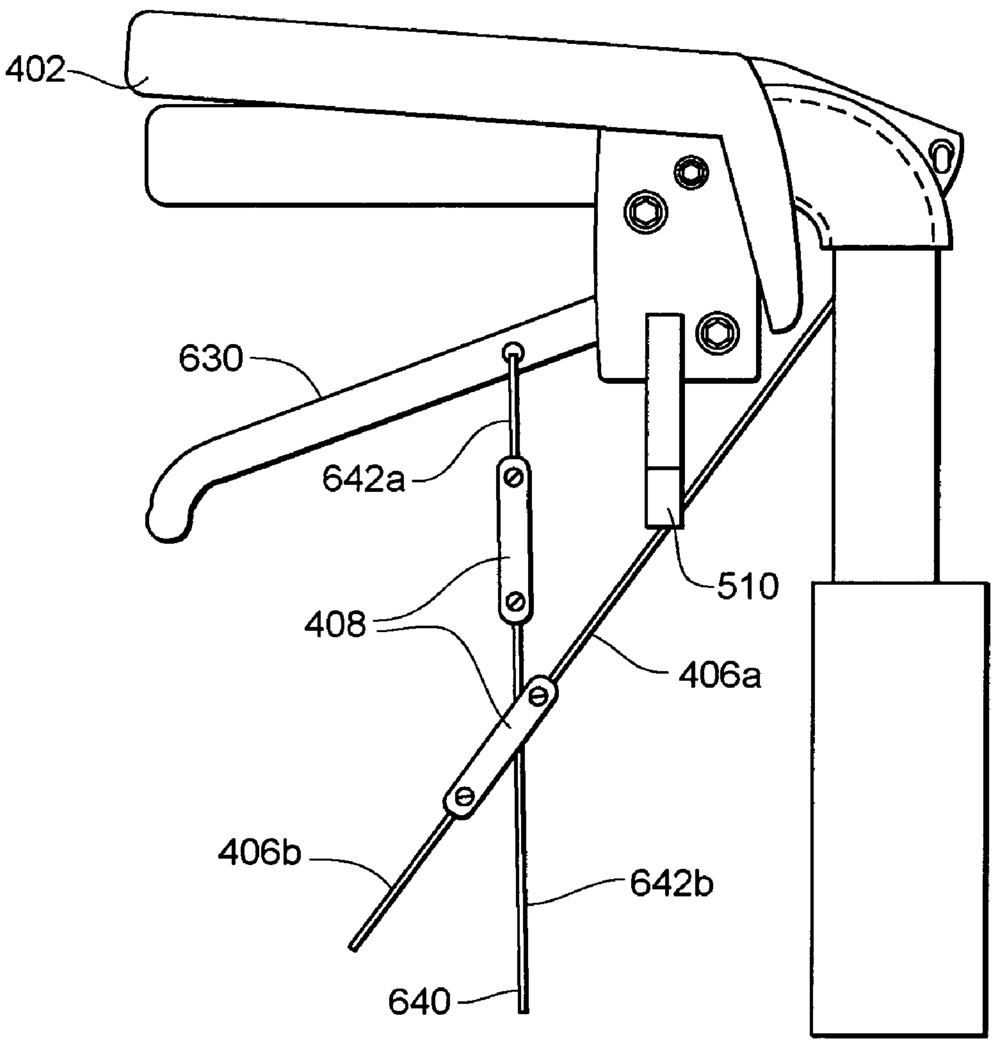
FIG. 16 is a side view of an attendant break release assembly and a friction brake assembly according to an example embodiment of the present invention.
Figure 17:
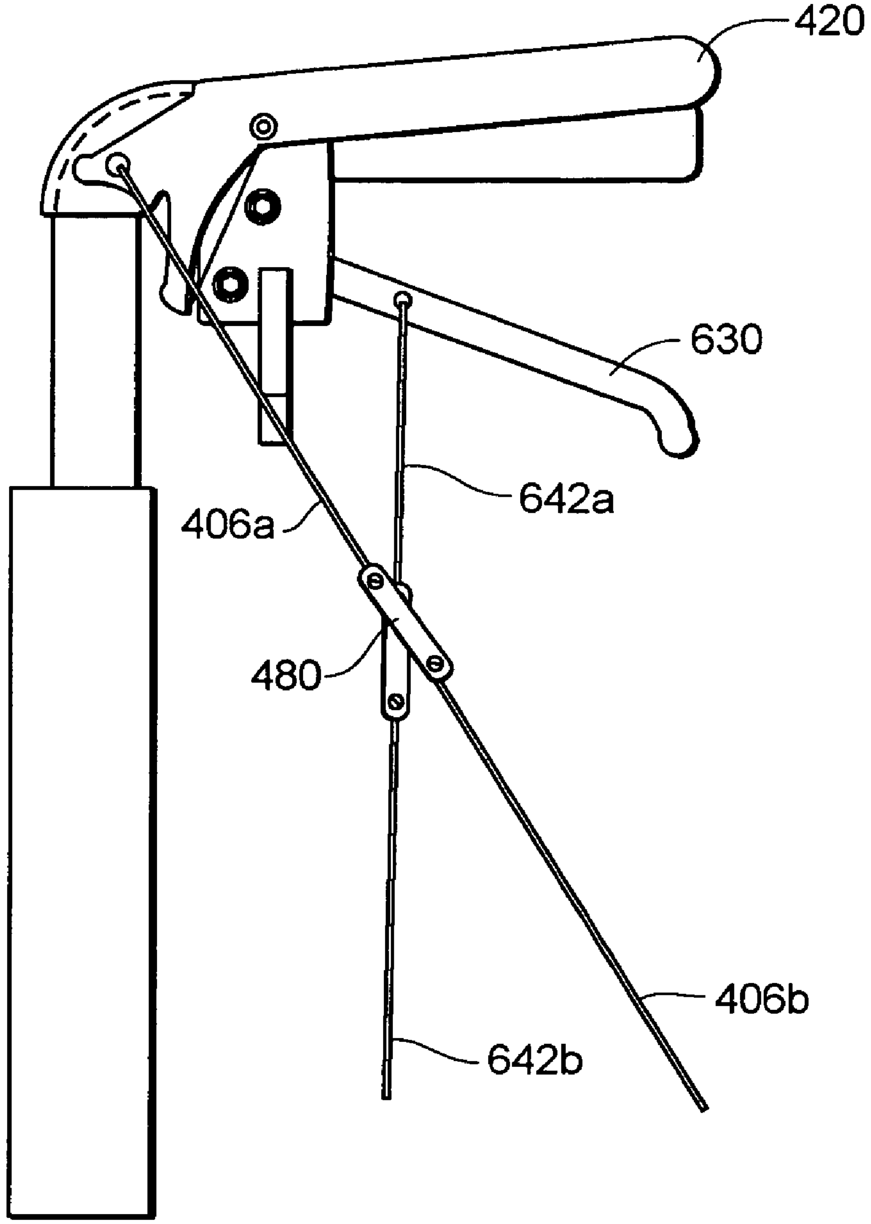
FIG. 17 is a side view of an attendant break release assembly and a friction brake assembly according to an example embodiment of the present invention.
Figure 18:
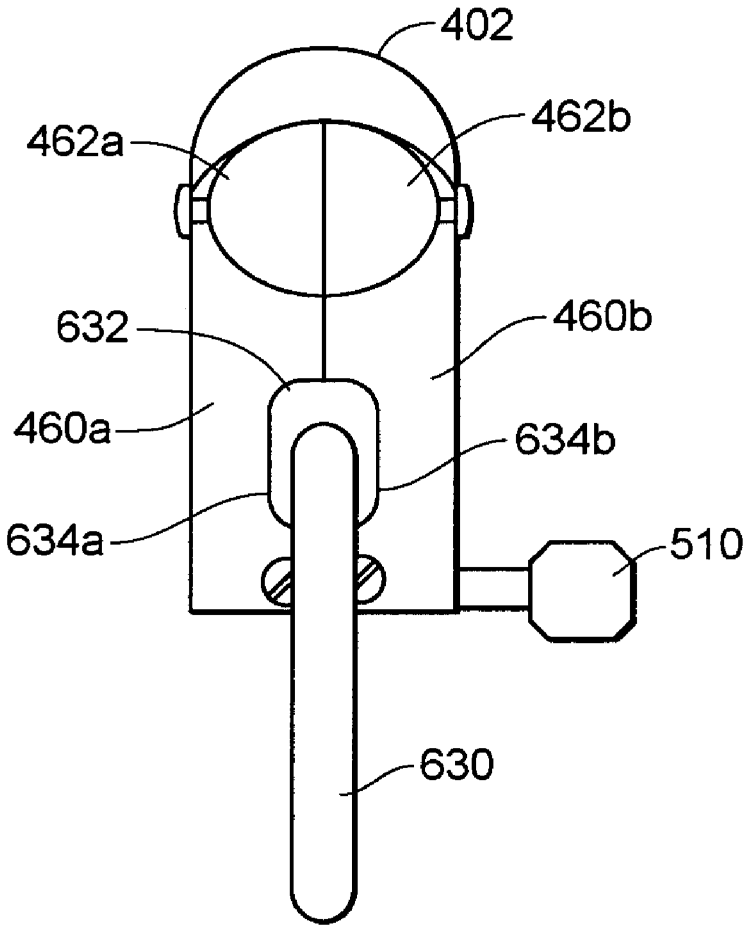
FIG. 18 is an end view of an attendant break release assembly and a friction brake assembly according to an example embodiment of the present invention.

As illustrated in FIGS. 11–18 and particularly FIGS. 16 and 17, an attendant operated friction brake actuation lever 630 is pivotally coupled to the coupling members 460*a* and 460*b* to actuate the control lever 610. The brake actuation lever 630 is positioned generally below the handle of the wheelchair 102 and oriented generally parallel to the handle of the wheelchair 102. As shown in FIG. 18, the brake actuation lever 630 is pivotally disposed in an aperture 632 defined by grooves 634*a* and 634*b* extending into inner surfaces of the coupling members 460*a* and 460*b*.

Referring to FIGS. 16 and 17, a linkage 640 is coupled to and extends between the brake actuation lever 630 and either the plate portion 612 or the anchor portion 614 of the control lever 610. A length adjuster 408 may be disposed between a pair of linkage portions 642*a* and 642*b* to adjust an overall length of the linkage 640. The adjustment of the linkage 640 is identical to the adjustment of the linkage 403 described in detail above.

In operation, as the wheelchair 102 accelerates down the incline, the attendant can squeeze the friction brake actuation lever 630 toward the handle of the wheelchair 102, and concurrently the linkage 640 pivots the control lever 610 causing the plate portion 612 to engage the drive wheel 110*a* and/or 110*b*. By releasing the brake actuation lever 630, the plate portion 612 pivots away from and disengages the drive wheel 110*a* and/or 110*b*.

In one embodiment, some or all of the components of the present invention are made from materials capable of withstanding the temperatures or harsh chemicals associated with autoclaving or sterilization. The materials capable of being autoclaved or sterilized include, but are not limited to, stainless steel, aluminum, composite polymers, and other materials known to one skilled in the art.

Details of the present invention may be modified in numerous ways without departing from the spirit or scope of the present invention. For example, adjustable turnbuckles that adjust spring tension for different weight users could be replaced with a metal strap with a series of holes for different weight settings. Also, the hand release handles could utilize a clamp mounting mechanism to mount the handle on the back of the chair so that there would be no holes to drill to mount the brake system to the wheelchair. Various components of the present invention may be altered in shape or size without affecting the functionality of the device. Those skilled in the art will recognize other modifications or alternatives of the present invention without departing from the spirit or scope thereof.

Although the present invention has been described with reference to particular embodiments, one skilled in the art will recognize that changes may be made in form and detail without departing from the spirit and scope of the invention. Therefore, the illustrated embodiments should be considered in all respects as illustrative and not restrictive.

I claim:

1. A brake release assembly adapted to be retrofitted to an existing foldable wheelchair, the brake release assembly comprising:

a coupling member disposed on a foldable wheelchair frame proximate a handle portion thereof;

a hand release lever operably coupled to the coupling member and a wheel brake mechanism, the release lever configured to disengage the wheel brake mechanism from a wheel of the wheelchair when depressed by a user; and a switch disposed in the coupling member and which is configured to selectively lock the hand release lever in the disengaged position, wherein the switch is disposed on the coupling member such that gravity will cause the switch to release when the hand release lever is momentarily depressed.

2. The brake release assembly of claim 1, wherein the coupling member further includes a securing assembly configured to retain the switch in a locked position until an operator moves the switch to an unlocked position.

3. The brake release assembly of claim 1, further comprising a friction brake actuation lever disposed on the coupling member and operably connected to a friction brake assembly.

4. The brake release assembly of claim 1, wherein the wheel brake mechanism is configured to move between an engaged position that generally inhibits movement of a wheel of a wheelchair when unoccupied and a disengaged position permitting free movement of the existing wheelchair when occupied.

5. The brake release assembly of claim 1, wherein the wheel brake mechanism is configured to generally inhibit movement of a wheel of a wheelchair regardless of the presence of an occupant unless the hand release lever is depressed.

6. The brake release assembly of claim 1, further comprising a linkage operably coupled to the wheel brake mechanism and the release lever.

7. The brake release assembly of claim 1, wherein the linkage includes an adjustor disposed thereon.

8. A brake release assembly adapted to be retrofitted to an existing foldable wheelchair, the brake release assembly comprising:

a coupling member disposed on a foldable wheelchair frame proximate a handle portion thereof;

a hand release lever operably coupled to the coupling member and a wheel brake mechanism, the release lever configured to disengage the wheel brake mechanism from a wheel of the wheelchair when depressed by a user; and a switch disposed in the coupling member and which is configured to selectively lock the hand release lever in the disengaged position, wherein the switch is disposed on the coupling member such that gravity will cause the switch to release when a patient sits in the wheelchair.

9. The brake release assembly of claim 8, wherein the coupling member further includes a securing assembly configured to retain the switch in a locked position until an operator moves the switch to an unlocked position.

10. The brake release assembly of claim 8, further comprising a friction brake actuation lever disposed on the coupling member and operably connected to a friction brake assembly.

11. The brake release assembly of claim 8, wherein the wheel brake mechanism is configured to move between an engaged position that generally inhibits movement of a wheel of a wheelchair when unoccupied and a disengaged position permitting free movement of the existing wheelchair when occupied.

12. The brake release assembly of claim 8, wherein the wheel brake mechanism is configured to generally inhibit movement of a wheel of a wheelchair regardless of the presence of an occupant unless the hand release lever is depressed.

13. A brake release assembly retrofittable to an existing foldable wheelchair, the brake release assembly comprising:

a first coupling member disposed on a foldable wheelchair frame proximate a first handle thereof;

a second coupling member disposed proximate a second handle of the foldable wheelchair frame;

a first hand release lever operably coupled to the first coupling member and a first wheel brake mechanism, the first release lever configured to disengage the first wheel brake mechanism from a first wheel of the wheelchair when depressed by a user;

a switch disposed in each of the first and the second coupling members and which is configured to selectively lock the first hand release lever in the disengaged position; and a friction brake lever configured to engage a friction braking assembly, said friction braking assembly operably coupled to the wheelchair, the friction brake lever proximate and generally opposed to the hand release lever, wherein the switch is disposed on the first and second coupling members such that gravity will cause the switch to release when the first hand release lever is momentarily depressed.

14. The brake release assembly of claim 13, wherein each of the first and the second coupling members further include a securing assembly configured to retain the switch in a locked position until an operator moves the switch to an unlocked position.

15. The brake release assembly of claim 8, further comprising a linkage operably coupled to the wheel brake mechanism and the release lever.

16. A brake release assembly retrofittable to an existing foldable wheelchair, the brake release assembly comprising:

a first coupling member disposed on a foldable wheelchair frame proximate a first handle thereof;

a second coupling member disposed proximate a second handle of the foldable wheelchair frame;

a first hand release lever operably coupled to the first coupling member and a first wheel brake mechanism, the first release lever configured to disengage the first wheel brake mechanism from a first wheel of the wheelchair when depressed by a user;

a switch disposed in each of the first and the second coupling members and which is configured to selectively lock the first hand release lever in the disengaged position; and a friction brake lever configured to engage a friction braking assembly, said friction braking assembly operably coupled to the wheelchair, the friction brake lever proximate and generally opposed to the hand release lever, wherein the switch is disposed on the first and the second coupling members such that gravity will cause the switch to release when a patient sits in the wheelchair.

17. The brake release assembly of claim 16, wherein each of the first and the second coupling members further include a securing assembly configured to retain the switch in a locked position until an operator moves the switch to an unlocked position.

* * * * *